United States Patent [19]

Honjo et al.

[11] Patent Number: 5,754,356
[45] Date of Patent: May 19, 1998

[54] TRACKING ERROR DETECTOR WITH COMPARISON OF AMPLITUDE DETECTED PILOT SIGNALS LEAKING IN FROM TRACKS ADJACENT TO THE TARGET TRACK

[75] Inventors: Kenichi Honjo, Kobe; Toshihiko Maruoka, Ikeda; Haruo Isaka, Yawata; Makoto Gotou, Nishinomiya; Kei Ichikawa, Osaka; Kiyokazu Hashimoto, Matsubara; Masafumi Shimotashiro, Katano, all of Japan

[73] Assignee: Matsushita Electric Industrial Co., Ltd., Osaka-fu, Japan

[21] Appl. No.: 612,816

[22] Filed: Mar. 22, 1996

Related U.S. Application Data

[63] Continuation of Ser. No. 177,959, Jan. 6, 1994, abandoned.

[30] Foreign Application Priority Data

| Jan. 6, 1993 | [JP] | Japan | 5-000508 |
| Jan. 28, 1993 | [JP] | Japan | 5-012287 |
| Jan. 28, 1993 | [JP] | Japan | 5-012290 |

[51] Int. Cl.⁶ .......................... G11B 5/02; G11B 27/10; G11B 15/467
[52] U.S. Cl. ........................ 360/73.12; 360/77.14; 360/39
[58] Field of Search ............... 360/73.12, 64, 360/70, 10.2, 77.12, 77.14, 77.15, 19.1, 37.1, 254, 9.1, 18, 27, 28, 46, 71, 75, 69, 77.04; 327/347, 349, 354, 356, 361

[56] References Cited

U.S. PATENT DOCUMENTS

| 4,509,083 | 4/1985 | Nakano | 360/77.14 |
| 4,658,309 | 4/1987 | Yasuda et al. | 360/77.14 |
| 4,663,673 | 5/1987 | Doutsubo | 360/9.1 |
| 4,665,447 | 5/1987 | Odaka | 360/77.14 |
| 4,760,474 | 7/1988 | Takimoto | 360/64 |
| 4,811,129 | 3/1989 | Kubo | 360/73.12 |
| 4,816,930 | 3/1989 | Kubo et al. | 360/10.2 |
| 4,853,809 | 8/1989 | Nemoto | 360/10.3 |
| 4,905,108 | 2/1990 | Otokawa | 360/77.14 |
| 5,010,424 | 4/1991 | Hasegawa et al. | 360/77.14 |
| 5,126,892 | 6/1992 | Nagasawa et al. | 360/10.2 X |
| 5,182,681 | 1/1993 | Yamazaki | 360/70 |
| 5,258,879 | 11/1993 | Shimotashiro et al. | 360/77.14 |
| 5,313,338 | 5/1994 | Ichikawa et al. | 360/77.14 X |
| 5,321,557 | 6/1994 | Shimotashiro et al. | 360/37.1 |
| 5,359,473 | 10/1994 | Kaniwa et al. | 360/77.14 |
| 5,432,655 | 7/1995 | Nakamura et al. | 360/77.15 X |

FOREIGN PATENT DOCUMENTS

| A-0 137346 | 4/1985 | European Pat. Off. |
| A-0 208536 | 1/1987 | European Pat. Off. |
| A-0 508779 | 10/1992 | European Pat. Off. |
| A-0 564234 | 10/1993 | European Pat. Off. |
| A 3808198 | 9/1988 | Germany |
| 4276345 | 10/1992 | Japan |

*Primary Examiner*—Aristotelis M. Psitos
*Assistant Examiner*—K. Wong
*Attorney, Agent, or Firm*—Wenderoth, Lind & Ponack

[57] ABSTRACT

A magnetic recording and reproducing apparatus includes: a recorder for recording information signals so as to form tracks obliquely on a magnetic tape, and for recording pilot signals so that the frequency may differ between different modes such as SP and LP; a reproducing head for reproducing recorded information; an error detecting circuit for comparing the level difference of pilot signals recorded in both tracks adjacent to the track to be scanned by there producing head and for outputting a tracking error signal; and a controller for controlling the feed of the magnetic tape so that the tracking error signal may be balanced. Preferably, in the LP mode, a pilot signal of a higher frequency than that used in the SP mode is recorded. In a tracking error detector for a magnetic recording and reproducing apparatus for detecting the pilot signal, the reproduced signals are sampled at a frequency at a common multiple of each pilot frequency, a pilot signal is detected, and a tracking error signal is output.

2 Claims, 12 Drawing Sheets

TRACK OFFSET OF THE HEAD 101a

TRACK OFFSET OF THE HEAD 201a

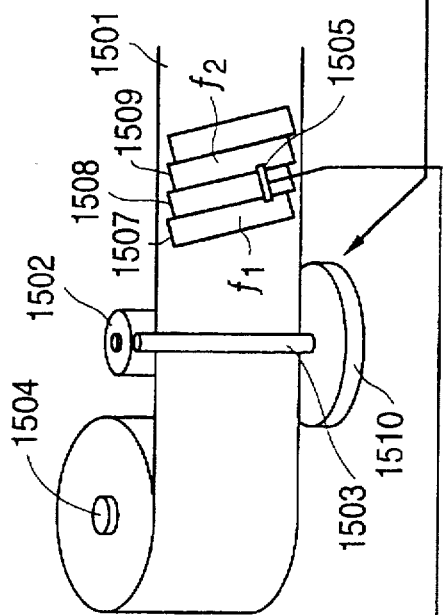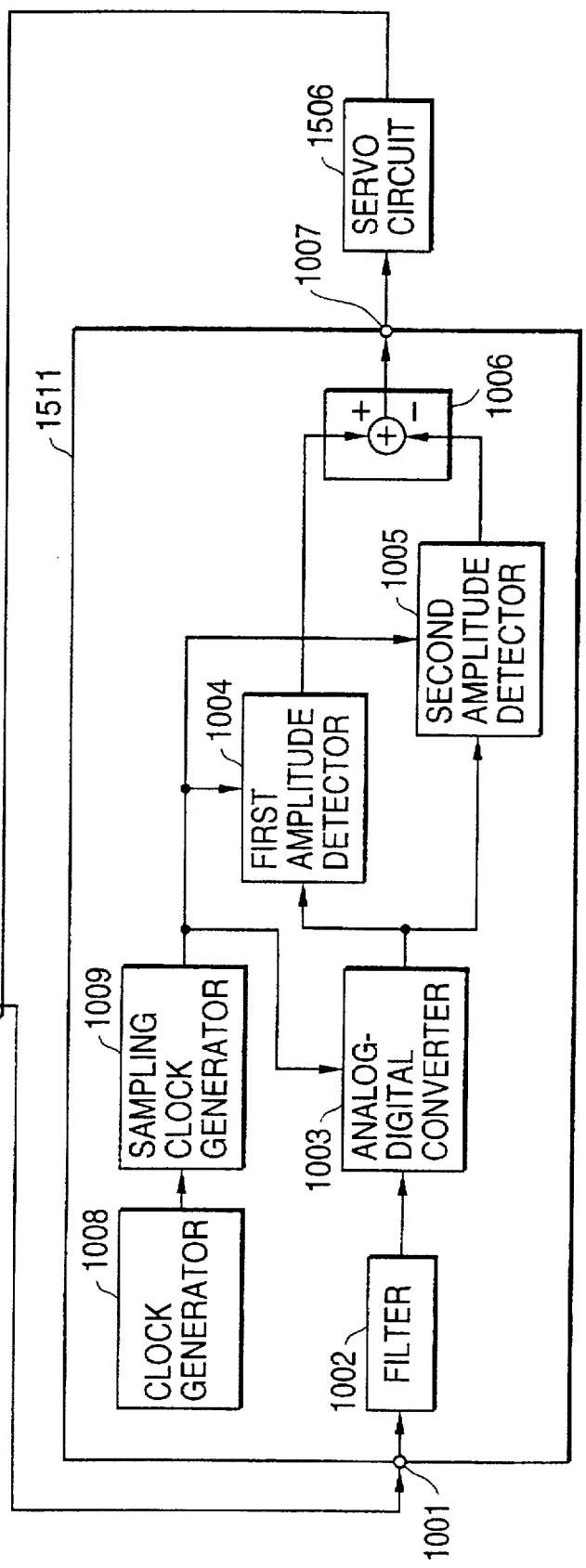
FIG. 9

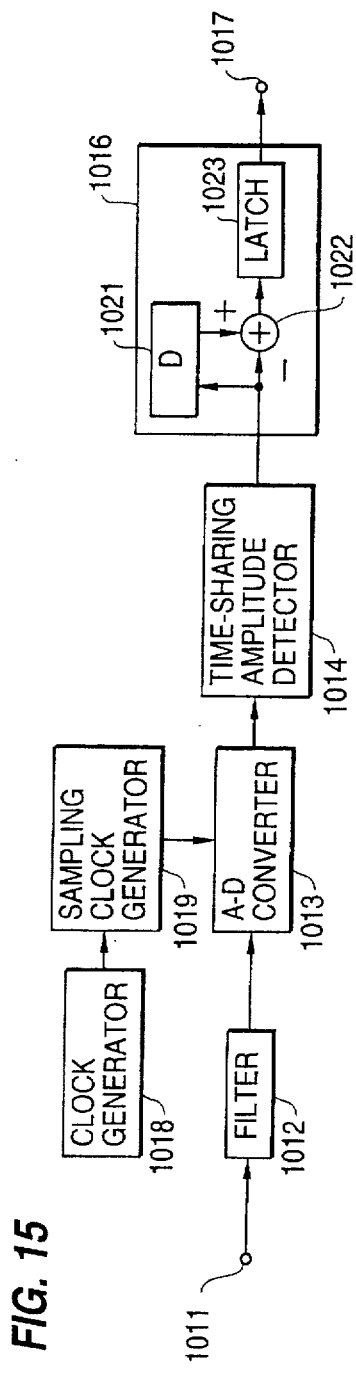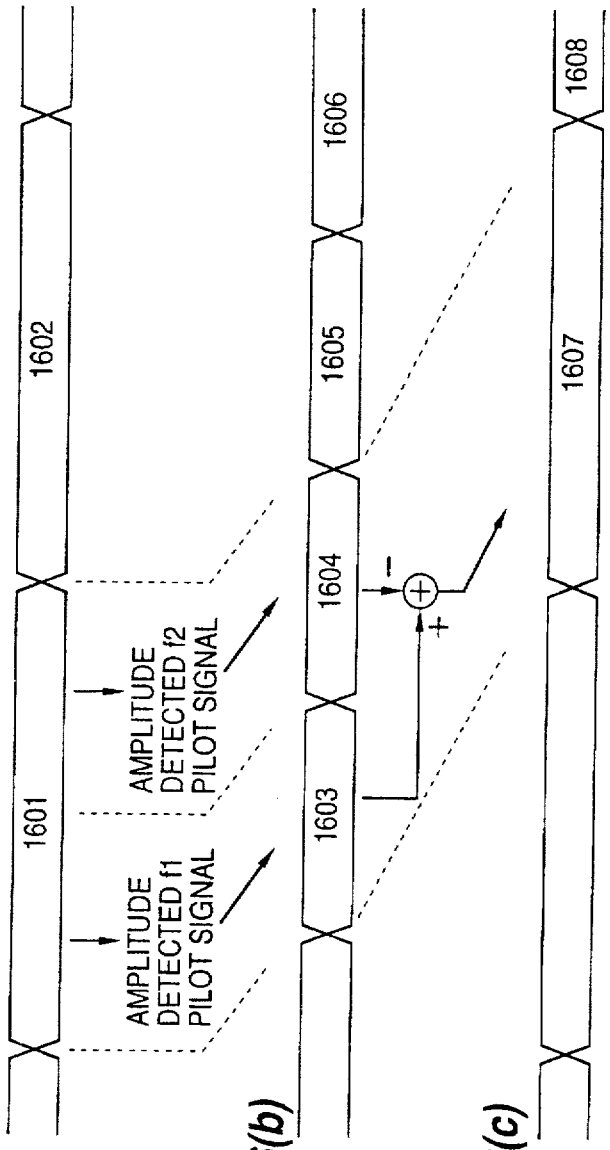

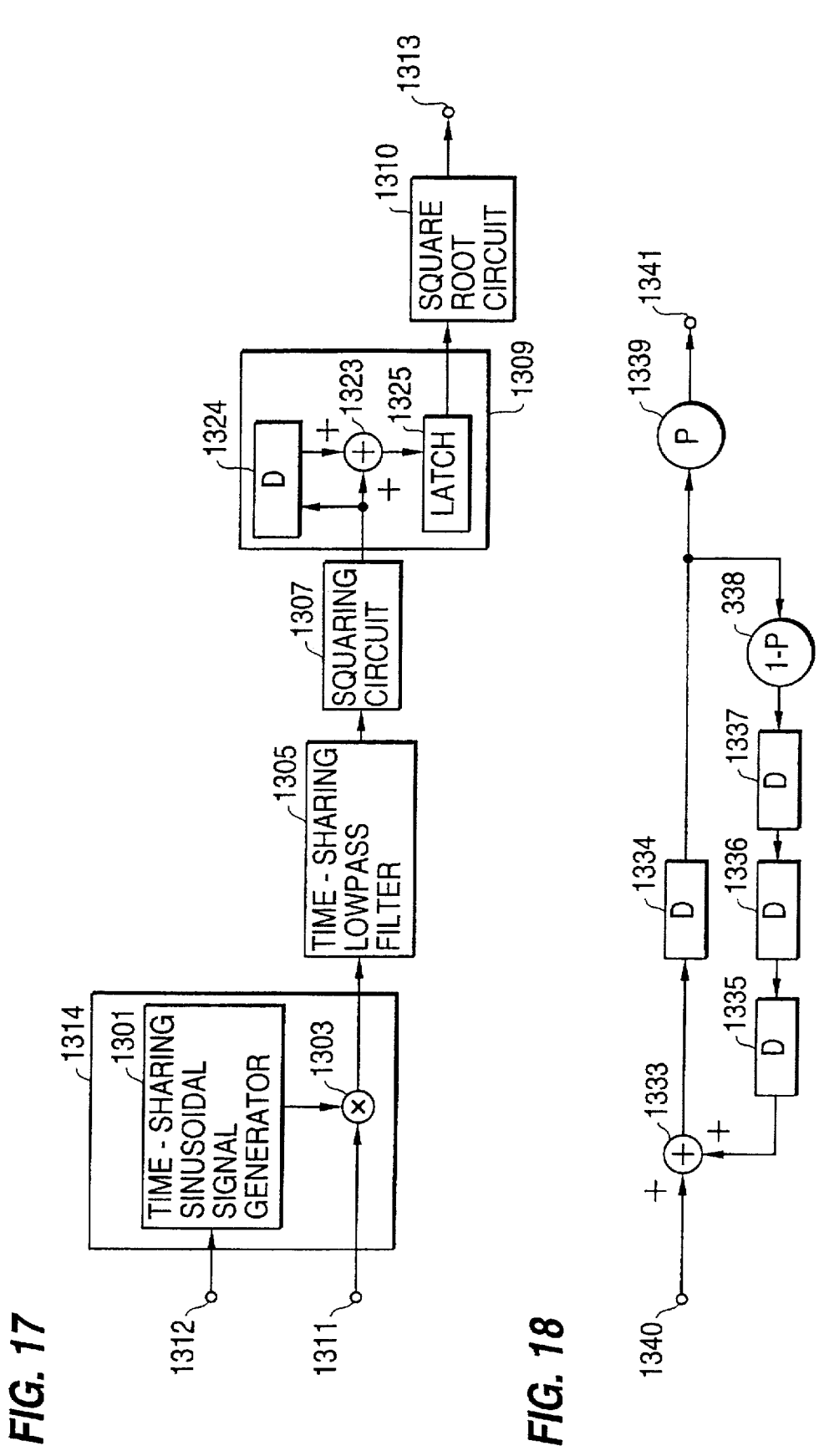

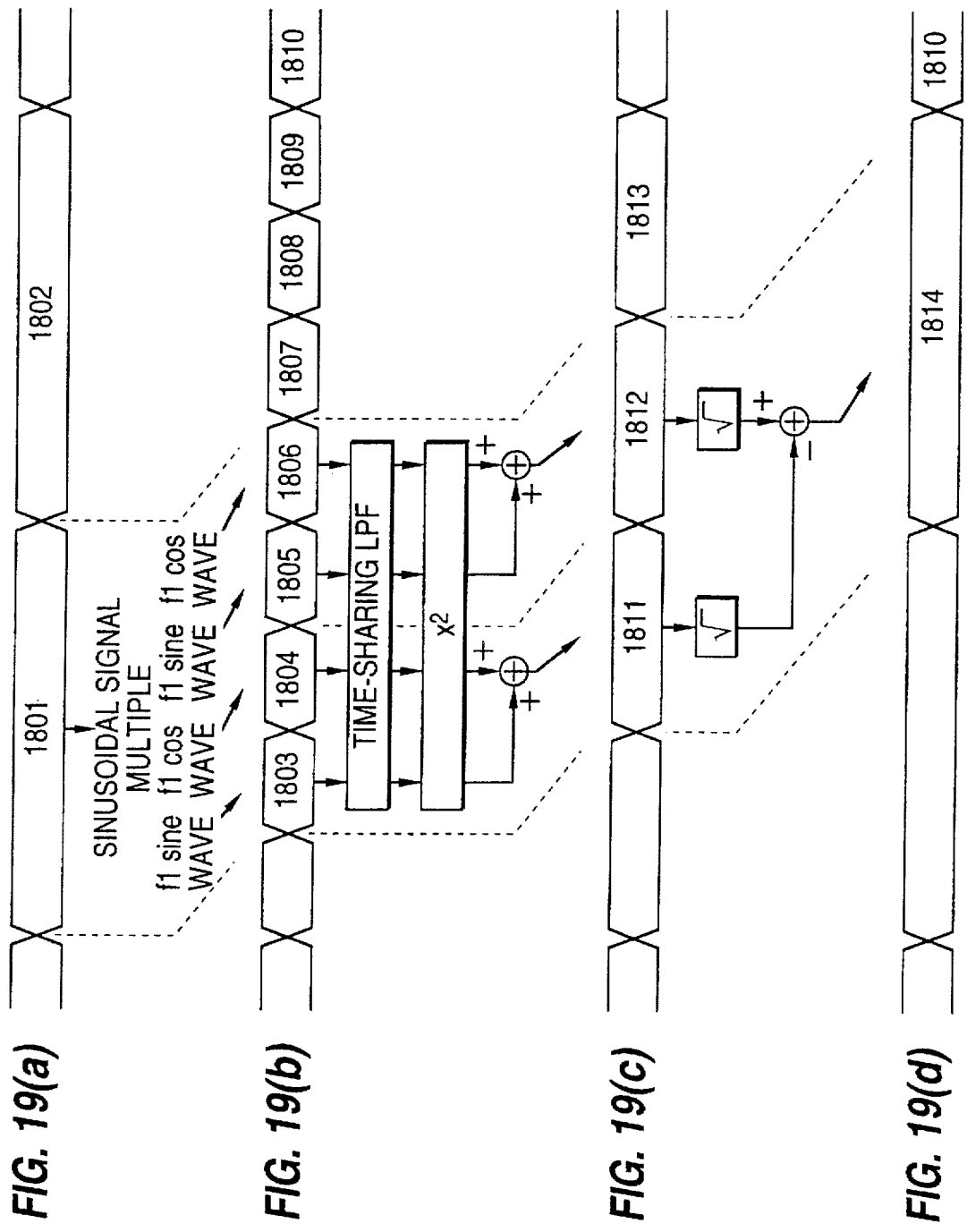

TRACKING ERROR DETECTOR WITH COMPARISON OF AMPLITUDE DETECTED PILOT SIGNALS LEAKING IN FROM TRACKS ADJACENT TO THE TARGET TRACK

This application is a Continuation of now abandoned application, Ser. No. 08/177,959, filed Jan. 6, 1994, now abandoned.

BACKGROUND OF THE INVENTION

1. Field of the Invention

The present invention relates to a magnetic recording and reproducing apparatus for recording and reproducing picture, sound, data, etc., on a magnetic tape, and more particularly to a tracking control for such a magnetic recording and reproducing apparatus.

2. Description of the Prior Art

Magnetic recording and reproducing apparatuses using magnetic tape as a recording medium, such as video cassette recorders, have been developed and are widely available. Manufacturers are promoting development for downsizing and digitizing the apparatus by further higher density recording. To raise the recording density while maintaining the compatibility, accurate tracking of the head and track is essential. As a technique for realizing accurate tracking, the tracking control method of automatic track finding (ATF) has been used to replace the conventional tracking control method using a control signal using a fixed head. In the ATF control method, a pilot signal is multiplexed in an frequency or modulated and recorded in information signal, or is recorded in bursts in a different region from the information signal, and tracking is controlled by comparing the level of the pilot signal leaking in from both adjacent tracks of the track to be scanned by the head during reproducing. This method is disclosed, for example, in U.S. Pat. Nos. 5,126,892 and 5,182,681.

Incidentally, the magnetic recording and reproducing apparatus is required to possess a function of changing over the recording time per reel of magnetic tape depending on the applications of the users, such as the standard playing (SP) mode and the long playing (LP) mode. Tracking control at high precision in any mode, and easy and automatic judgement of the recording mode during reproducing are important elements for the development of the ATF control method.

First of all, to realize tracking control at high precision in any mode, it is essential to detect a tracking error sensitively and linearly regardless of the mode. Above all, it is important to optimize the frequency of the pilot signal. By lowering the frequency of the pilot signal, the apparent head width increases due to the reproduction fringe effect of inducing magnetic flux in a wider range than the head width occurring in the head, and the detection sensitivity is lowered. On the other hand, by raising the frequency of the pilot signal, linearity of detection is worsened by azimuth loss. It is hence necessary to set the frequency of the pilot signal by considering all of these parameters.

However, when the frequency of the pilot signal is optimized in the SP mode, in the LP mode using a narrow track width, not only is the detection sensitivity lowered due to the same reproduction fringe as in the SP mode, but also a dead zone is likely to be formed during the detection. To the contrary, when the pilot signal is similarly optimized in the LP mode, the range for keeping linearity is narrow, and the frequency of the pilot signal is higher than the optimum value in the SP mode, and the linearity of detection is worsened in the SP mode. Therefore, in the conventional method of using a pilot signal of the same frequency apparatus of the invention.

DESCRIPTION OF THE PREFERRED EMBODIMENTS

A first embodiment of the invention is described with reference to drawings. FIG. 1 is a structural diagram of a magnetic recording and reproducing apparatus according to the first embodiment of the invention. The constituent elements functioning alike are identified with same reference numerals in the subsequent second and third embodiments. In FIG. 1, a reel 10 winds up a magnetic tape 9 with a proper tension. A capstan 11 drives the magnetic tape 9 at a proper speed by means of a servo circuit 7. A pinch roller 12 presses the tape 9 to the capstan 11. A head 1 detects a frequency generation (FG) signal magnetized on the capstan 11, and an amplifier 2 amplifies the FG signal. Heads 101a and 101b are wide heads for SP mode mutually different in the azimuth angle, being mounted on a rotary drum 100 confronting each other at 180 degrees, and are used as being sequentially changed over by a head switch. Heads 201a, 201b are narrow heads for LP mode mutually different in the regardless of the mode, it was difficult to realize a tracking control of high precision in any mode. On the other hand, for easy and automatic judgement of the recording mode, the following methods have been hitherto known. When reproducing in a mode which is different from that of the recording mode:

- a method of judging by the period of the reproduced pilot signal;
- a method of judging by the period of the tracking error signal;
- a method of judging by the fluctuation level of the tracking error signal.

These methods are disclosed, for example, in the U.S. Pat. No. 4,811,129.

However, in the method of judging the recording mode by the period of the reproduced pilot signal or tracking error signal, it is necessary to reproduce a plurality of tracks and detect a stable period, and the judging circuit is complicated, and judgement is difficult, and the tape speed cannot be changed over immediately. In the method of judging the recording mode by the fluctuation level of the tracking error signal, it is difficult to set the threshold in relation to the fluctuation of the tracking error in the normal play mode.

In the ATF control, pilot signals of several different frequencies are cyclically changed over, and recorded by multiplexing in frequency on the information to be recorded, or modulating the information signal. During reproducing, the pilot signals leaking from both tracks adjacent to the reproduced track are reproduced as reproduced signals together with the desired reproduced signal. The amplitude of the pilot signals from both adjacent tracks contained in the reproduced signals is detected by a pilot detector. The difference is determined by a differential circuit by using the amplitude of the two types of pilot signals being detected. Depending on the deviation of the target track and the head, the amplitude of each pilot signal varies differentially, and the output of the differential circuit becomes a tracking error signal, changing positively or negatively depending on the tracking error. Hereinafter, a tracking error detector refers to a device for detecting a pilot signal from reproduced signals and for issuing a tracking error signal. The thus obtained tracking error signal controls the capstan motor which is responsible for tape feeding through a servo circuit, so that the configuration of the head and the target track can always be kept correctly.

In the conventional tracking error detector used in magnetic recording and reproducing apparatus, the pilot detector is composed of reference signal generator, multiplexer, band pass filter and rectifier, and the reproduced signal is converted to a low frequency range by the reference signal generator, multiplexer and bandpass filter, and the pilot signal component is extracted by the bandpass filter, and its amplitude is detected in the rectifier. The difference of the amplitude of two detected pilot signals is calculated in the differential amplifier, and a tracking error signal is issued. (For example, see U.S. Pat. No. 5,126,892)

In such a conventional tracking error detector, however, the bandpass filter and rectifier are composed of analog circuits basically constituted with coils, capacitors and resistances, and in the bandpass filter, in particular, capacitors of large capacitance, resistances and coils are required, and an IC design was difficult. Moreover, the capacitors, resistances and coils composing the bandpass filter tend to vary in the characteristics of elements depending on the environment or the conditions of fabrication. Accordingly, the center frequency detected from the frequency of pilot signal is deviated, or the gain fluctuates, thereby causing the detection characteristic to worsen. To solve these problems, an adjusting circuit is required, which required an additional cost.

SUMMARY OF THE INVENTION

It is hence a primary object of the invention to present a magnetic recording and reproducing apparatus capable of controlling tracking precisely in plural modes, and judging the recording mode easily.

To achieve the object, the invention presents a magnetic recording and reproducing apparatus comprising a tape driver for driving a magnetic tape at least at two different tape feed speeds, a recording circuit for recording information signals containing at least one pilot signal so as to form tracks obliquely with respect to the longitudinal direction on the magnetic tape, and recording so that the frequency of at least one pilot signal is different at different feed speeds of the magnetic tape, a reproducing head for reproducing recorded signals from the magnetic tape and obtaining reproduced signals, an error detector for outputting as a tracking error signal the level difference of pilot signals recorded in both tracks adjacent to the track to be scanned by the reproducing head from the reproduced signals, and a controller for controlling the feed speed of the magnetic tape by controlling the tape driver depending on the tracking error signal.

Preferably, the recording circuit may record a pilot signal of higher frequency when the width of the track determined by the feed speed of magnetic tape is narrower.

In this constitution, in any mode, a tracking error signal of the reproducing head can be detected linearly, and hence a tracking control of high performance can be realized regardless of the mode. Especially in the LP mode, a dead zone or similar phenomenon is not caused, and the sensitivity may be further enhanced.

Moreover, since the recording mode can be judged by the frequency of the pilot signal when reproducing, the complicated judging circuit is not necessary and it is liberated from the step of reproducing a plurality of tracks in which pilot signals are recorded, and only when the track is reproduced in a mode different from the recording mode, it is immediately changed to the recording mode.

It is other object of the invention to present tracking error detector for a magnetic recording and reproducing apparatus which is resistant to the fluctuation of elements composing the circuits, and is capable of detecting the pilot signal correctly without any adjustment, and is easy to be designed in an IC.

To achieve the object, the invention presents tracking error detector for reproducing tracks formed obliquely with respect to the longitudinal direction of the magnetic tape in which pilot signals are recorded in multiplex with information signals by a rotary head, and forming a tracking error signal for correcting deviation of scanning traces of the rotary head relative to a main track, by the level difference of pilot signals reproduced from both tracks adjacent to the main track to be reproduced and scanned by the rotary head, comprising a sampler for analog-digital conversion of reproduced signals, a first amplitude detector for detecting the amplitude of the pilot signal from one of adjacent tracks from the output signals of the sampler, a second amplitude detector for detecting the pilot signal from the other adjacent track, and a subtractor for determining the difference of the outputs of the first and second amplitude detector and for outputting a tracking error signal, wherein the sampling frequency of the sampler is nearly equal to a common multiple of each pilot frequency leaking in from both adjacent tracks.

In this constitution, since the error signal is determined on the basis of the analog-digital converted value at the sampling frequency of a common multiple of each pilot signal, it is free from the effects of fluctuations of the elements such as capacitors, coils and resistances, and a tracking error detector which is simple in constitution and easy in IC design can be presented.

BRIEF DESCRIPTION OF THE DRAWINGS

FIG. 9 is a block diagram of a first embodiment of a tracking error detector for the magnetic recording and reproducing apparatus of the present invention.

FIG. 15 is a block diagram of a tracking error detector in a second embodiment of a tracking error detector for the magnetic recording and reproducing apparatus of the present invention.

FIGS. 16(a)–16(c) form a time chart of the tracking error detector in the second embodiment of the tracking error detector for the magnetic recording and reproducing apparatus of the present invention.

FIG. 17 is a block diagram of a time-sharing amplitude detector in the second embodiment of the tracking error detector for the magnetic recording and reproducing apparatus of the present invention.

FIG. 18 is a block diagram of a time-sharing lowpass filter in the second embodiment of the tracking error detector for the magnetic recording and reproducing apparatus of the present invention.

FIGS. 19(a)–19(d) form a time chart of a tracking error detector of orthogonal two-phase signal multiple detection in the second embodiment of the tracking error detector for the magnetic recording and reproducing apparatus of the present invention.

DESCRIPTION OF THE PREFERRED EMBODIMENTS

Figure 1A:
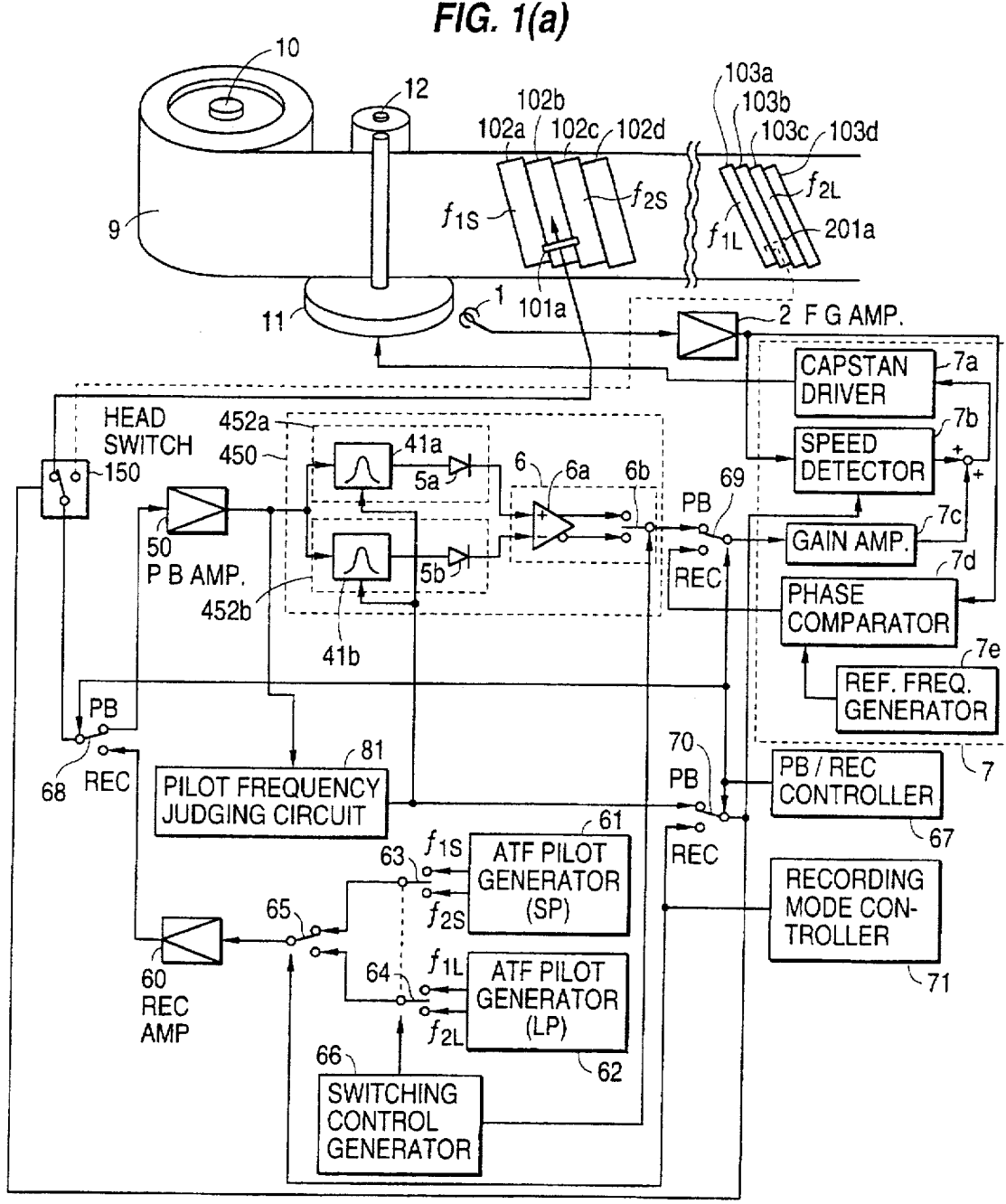
FIGS. 1(a) and 1(b) are structural diagrams of a magnetic recording and reproducing apparatus in accordance with a first embodiment of the present invention.
Figure 1B:
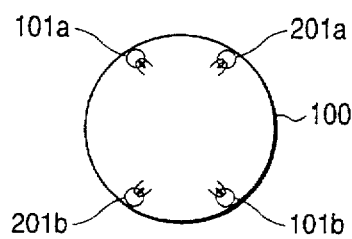

A first embodiment of the present invention is described with reference to the attached drawings. FIGS. 1(a)–1(b) are structural diagrams of a magnetic recording and reproducing apparatus according to the first embodiment of the present invention. The constituent elements functioning alike are identified by the same reference numerals in the subsequent second and third embodiments. In FIGS. 1(a)–1(b), a reel 10 winds up a magnetic tape 9 with a proper tension. A capstan 11 drives the magnetic tape at a proper speed by means of a servo circuit 7. A pinch roller 12 presses the tape 9 to the capstan 11. A head 1 detects a frequency generation (FG) signal magnetized on the capstan 11, and an amplifier 2 amplifies the FG signal. Heads 101a and 101b are wide heads for the SP mode and have mutually different azimuth angles, being mounted on a rotary drum 100 confronting each other at 180 degrees, and are sequentially changed over by a head switch 150. Heads 201a and 201b are narrow heads for the LP mode and have mutually different azimuth angles, being mounted on the rotary drum 100 confronting each other at 180 degrees, and are sequentially changed over by the head switch 150. The servo circuit 7 is mainly composed of a capstan driving circuit 7a, a speed detector 7b, and a phase comparator 7d, and a reference frequency generator 7e and a gain amplifier 7c connected to the phase comparator 7d.

First, the operating principle during recording is described. Switches 68, 69, and 70 are changed to the recording side by a play/record controller 67. A recording mode controller 71 selects the SP mode or LP mode, and changes over the head for the SP or LP mode by the head switch 150. An ATF pilot generator 61 outputs pilot signals $f_{10}$ and $f_{20}$ in the SP mode, and an ATF pilot generator 62 outputs pilot signal $f_{1L}$ and $f_{2L}$ in the LP mode, and their frequencies are different. In the SP mode, the magnetic tape 9 is fed at a speed corresponding to the SP mode by the servo circuit 7. A switching control circuit 66 outputs ternary pulses synchronized with the period of the head switch, and changes over switches 63 and 64 sequentially to upper side ON, OPEN and lower side ON, so that the pilot signal $f_{10}/f_{20}$ amplified by a recording (REC) amplifier 60 may be alternately recorded on every other track on the magnetic tape 9 by the head 101b as shown by 102a and 102b in FIG. 1(a). Thereafter, similar patterns 102a to 102d are repeatedly recorded. Similarly, in the LP mode, the magnetic tape 9 is sent at a speed depending on the LP mode by the servo circuit 7, and as shown in 103a and 103c in FIG. 1(a), the pilot signal $f_{1L}f2L$ is alternately recorded on every other track on the magnetic tape 9 by the head 201b. Thereafter, similar patterns 103a to 103d are repeatedly recorded.

Next is explained the operating principle during reproduction. The switches 68, 69, and 70 are changed over to the play side by the play/record controller 67. It is assumed in this example that a judgement of the recording mode mentioned below has been already completed with the magnetic tape driven at a speed corresponding to the SP mode by the servo circuit 7, and that the head 101a is scanning the track 102b.

In the head 101a, aside from the information signal of the track 102b, pilot signals $f_{10}$ and $f_{20}$ leak in from both adjacent tracks 102a and 102c. After the reproduced signals are amplified by a playback amplifier 50, mutual pilot signal levels are compared by an ATF error detector 450, and a tracking error signal is output. In order that this tracking error signal may be balanced, the servo circuit 7 drives the capstan 11, and controls the phase of the feed of magnetic tape.

The ATF error detector 450 is composed of a first pilot detector 452a, second pilot detector 452b, and a subtracting circuit B. The first pilot detector is composed of a first bandpass filter 41a, and a first rectifier 5a, and the second pilot detector is composed of a second bandpass filter 41b and a second rectifier 5b. The first bandpass filter 41a and first rectifier 5a extract and rectify the pilot signal $f_{10}$. Likewise, the second bandpass filter 41 band second rectifier 5b extract and rectify the pilot signal $f_{20}$. The subtracting circuit 6 determines the output difference between the first and second pilot detectors, that is the tracking error signal. The head used to scan the tracks 102b, 102d is 101a, and the head used to scan the tracks 102a and 102c is 101b. Accordingly, by the track reproduced by the head 101a, the output change of the subtracting circuit 6 and the track deviation direction change in polarity. The subtracting circuit 6 is composed of a subtracting circuit 6a and a switch 6b. The switch 6b receives ternary pulses synchronized with the period of the head switch from the switching controller 66, and is sequentially changed over to upper side ON, OPEN, and lower side ON, thereby manipulating the polarity of the tracking error signal to be used actually depending on the track.

So far is explained the case in which the track recorded in the SP mode is reproduced in the SP mode, and when the track recorded in the LP mode is reproduced in the LP mode, the operating principle of the ATF control method is same as in the SP mode, assuming that the recording mode judgement mentioned below has been completed and that the detected pilot signals are $f_{1L}$ and $f_{2L}$.

During the reproducing operation, the principle of mode changeover operation when reproduced in a mode different from recording mode is described below. Pilot signals of different frequencies are already recorded in the SP mode and the LP mode, and the recording mode can be judged by detecting the frequency of the pilot signal contained in the reproduced signal. Accordingly, a pilot frequency judging circuit 81 judges the recording mode by the frequency of the reproduced pilot signal, and changes over the feed speed of the magnetic tape by the servo circuit 7, the detection band of the ATF error detector 450, and the head by the head selector 150, depending on the mode, according to the result of the judgement.

Figure 2:
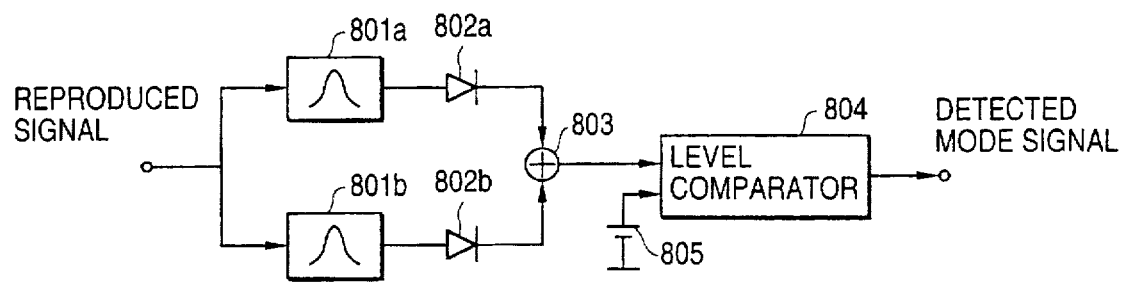
FIG. 2 is a structural diagram of a pilot frequency judging circuit used in first, second and third embodiments of the present invention.

FIG. 2 is a structural diagram of the pilot frequency judging circuit 81. The center frequencies of a third bandpass filter 801a and a fourth bandpass filter 801b are respectively selected so as to extract the pilot signal in the same mode. This example shows the case of selecting the pilot signals $f_{1L}$ and $f_{2L}$ of LP mode, and the operation of judgement of recording mode is described.

The pilot signal $f_{1L}$ is extracted and rectified by the third bandpass filer 801a and third rectifier 802a, and the signal $f_{2L}$ is extracted and rectified by the fourth bandpass filter 801b and fourth rectifier 802b. The outputs of the third and fourth rectifier are added by an adder 803, and the combined output value is compared with the threshold 805 in the level comparator 804. This threshold value 805 is set smaller than the output value of the adder 803 when the pilot signal $f_{1L}$, or $f_{2L}$ is reproduced, and set larger than the output value of the adder 803 when any signal other than the pilot signals $f_{1L}$ and $f_{2L}$ is reproduced. Therefore, in the example of the head 100a scanning the track 102b, the level detector 804 judges that the output value of the adder 803 is smaller than the threshold 805, and changes the tape speed during reproduction to the SP mode by the servo circuit 7. When reproducing a virgin tape, meanwhile, the mode is always determined to be the SP mode.

The reproducing head goes off the track region recorded in the SP mode, and gets into the track region recorded in LP mode, and when pilot signal $f_{1L}$ or $f_{2L}$ is reproduced, the output value of the adder 803 is larger than the threshold 805. The level comparator 804 judges that the reproduced track has been recorded in LP mode, and immediately the tape speed during reproduction is changed to the LP mode by the servo circuit 7, and the center frequencies of the first and second bandpass filers 41a and 41b are changed to $f_{1L}$ and $f_{2L}$, the head is changed to the LP head, respectively. To the contrary, when the reproducing head gets into the track region recorded in the SP mode from the track region recorded in the LP mode, similarly, the level detector 804 immediately changes the tape speed during reproduction to the SP mode by the servo circuit 7, the center frequencies of the first and second bandpass filters 41a and 41b to $f_{1O}$ and $f_{2O}$ and the head to the SP head, respectively. Thus, by recording pilot signals at different frequencies in the SP mode and the LP mode, the conventional trouble of reproducing a plurality of tracks for judging the recording mode is eliminated. When reproduced in a mode different from the recording mode, the mode can be immediately changed to the recording mode by detecting the pilot frequency. By detecting the frequency of the pilot signal, the recording mode is judged, so that the complicated judging circuit used in the prior art is not necessary, and the circuit may be simplified. Moreover, by changing over the reproducing head depending on the recording mode, the quality of image signals and so on can be enhanced. Herein is explained an example of using two pilot signals for judgement the of recording mode, but the same effect is obtained by using one pilot signal.

In the recording operation, by recording the pilot signal of a low frequency which is the same as in the prior art in the SP mode and recording the pilot signal of a high frequency which is about twice as high as that used in the prior art in the LP mode, the principle of the detection of the reproduced pilot signal is as described below.

Figure 3:
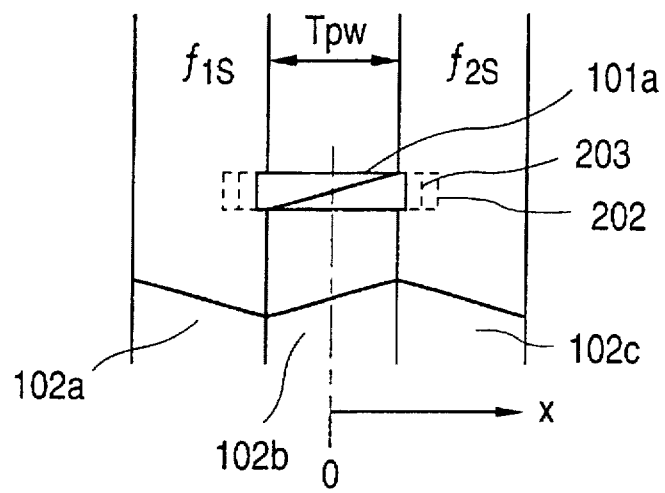
FIG. 3 is a diagram showing the detection principle of relative position of a reproducing head relative to tracks in the SP mode in the first, second and third embodiments of the present invention.
Figure 4:
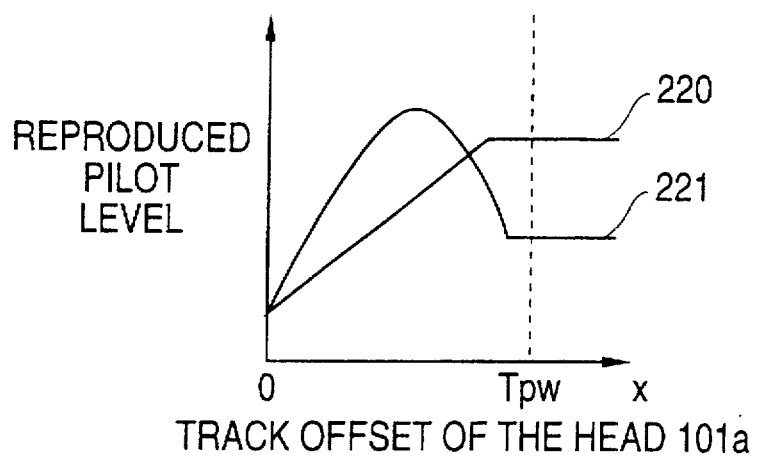
FIG. 4 is a graph showing the relationship of the track offset amount of head and level of reproduced pilot signals in the SP mode in the first, second and third embodiments of the present invention.

First is explained the detection of the reproduced pilot signal in the SP mode. FIG. 3 is a diagram showing the principle of detection of the relative position of the reproducing head relative to the tracks in the SP mode. FIG. 4 is a graph showing the relationship between the track offset amount of the head and the level of reproduced pilot signal in the SP mode.

In FIG. 3, the track 102a is a track in which the pilot signal at frequency $f_{10}$ is recorded with inverse azimuth with respect to the head 101a for the SP mode only, and track 102c is a track in which the pilot signal at frequency $f_{20}$ is recorded with inverse azimuth with respect to the head 101a, and track 102b is a main track to be reproduced and scanned by the head 101a, in which information signals are recorded with normal azimuth with respect to the head 101a. The track width of tracks 102a to 102c is $T_{pw}$. FIG. 3 also shows a reproduced fringe 202 of a pilot frequency band of the head 101a when the frequency of pilot signal is at a low frequency as in the prior art, and a reproduced fringe 203 in a pilot frequency band of the head 101a when the frequency of the pilot signal is about twice as high as in the prior art.

Assuming that the reproducing head 101a is off the track, the relationship between this offset amount and the level of reproduced pilot signal is explained while referring to FIG. 3 and FIG. 4. In FIG. 4, assuming the arrow direction of x-axis to be the positive direction, it becomes the relationship between the offset amount when the head 101a is off track to the track 102c side and the level of the reproduced pilot signal $f_{20}$, while, assuming the arrow direction of the x-axis to be the negative direction, it becomes the relationship between the offset amount when the head 101a is off track to the track 102a side and the level of the reproduced pilot signal $f_{10}$.

FIG. 4 shows a graph 220 representing the relationship between the track offset amount of the head 101a and the level of the reproduced pilot signal when the pilot signal is at a low frequency as in the prior art, and a graph 221 indicating the relationship between the track offset amount of the head 101a and the level of the reproduced pilot signal when the pilot signal is about twice as high as in the prior art.

To begin with, when the pilot signal is as low as in the prior art, the reproducing range of the head 101a in the width direction, that is, the apparent head width is wider than the actual head because the reproduced fringe is as in 202. However, the fringe amount is sufficiently small as compared with the track width $T_{pw}$ and the frequency of the pilot signal is as low as to be free from effect of the azimuth loss, as shown in FIG. 4, the pilot signal is detected linearly in a wide range relative to the track width $T_{pw}$ depending on the off-track degree of the head 101a.

On the other hand, when the frequency of the pilot signal is about twice as high as in the prior art, the apparent head width of the head 101a is narrower than in the case of a low frequency pilot signal because the reproduced fringe is 203. As known well, when the reproducing characteristic of the head is in a low frequency region, the characteristic is 6 dB/oct, and hence the reproduction level is higher than when the frequency is low. However, when the frequency of the pilot signal is high, by the azimuth characteristic, the pilot signal loses its linearity as the offset amount increases as shown by 221 in FIG. 4, and the level of the pilot signal is attenuated.

Figure 5:
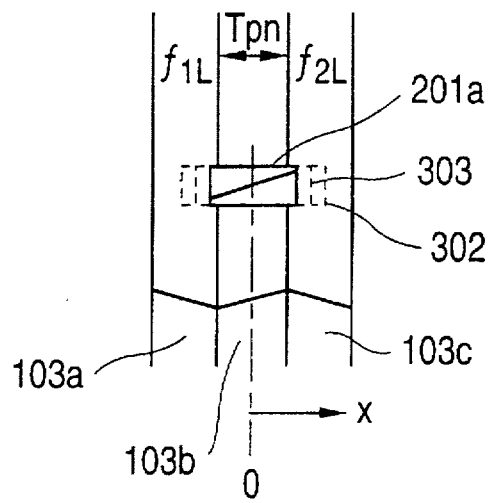
FIG. 5 is a diagram showing the detection principle of the relative position of a reproducing head relative to tracks in LP the mode in the first, second and third embodiments of the present invention.
Figure 6:
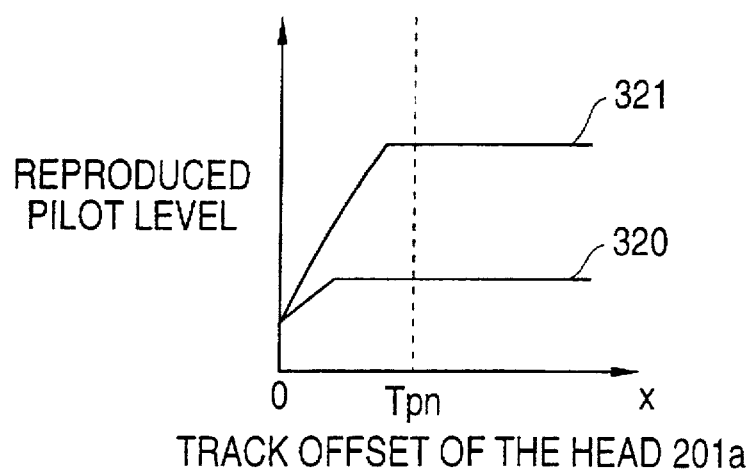
FIG. 6 is a graph showing the relationship of the track offset amount of head and level of reproduced pilot signals in the LP mode in the first, second and third embodiments of the present invention.

Described next is the detecting principle of the reproduced pilot signal in the LP mode. FIG. 5 shows the detection principle of the relative position of the head to the track in LP mode. FIG. 6 is a graph representing the relationship between the track offset amount of the head and the level of the reproduced pilot signal in the LP mode.

In FIG. 5, the track 103a is a track in which the pilot signal at frequency $f_{1L}$ is recorded with inverse azimuth with respect to the head 201a for the LP mode only, and the track 103c is a track in which the pilot signal at frequency $f_{2L}$ is recorded with inverse azimuth with respect to the head 201a, and the track 103b is a main track to be reproduced and scanned by the head 201a, and the information signals are recorded with normal azimuth with respect to the head 201a. Each track width of tracks 103a to 103c is $T_{pn}$ (½ of the track width $T_{pw}$, in the SP mode). FIG. 5 also shows a reproduced fringe 302 in the pilot frequency band of the head 201a when the pilot signal frequency is low as in the prior art, and a reproduced fringe 303 of the pilot frequency band of the head 201a when the pilot signal frequency is about twice as high as in the prior art.

Assuming the head 201a is off track, the relationship between the offset amount and the level of reproduced pilot signal is explained while referring to FIG. 5 and FIG. 6. In FIG. 6, assuming the arrow direction of the x-axis to be the positive direction, it becomes the relationship between the offset amount when the reproducing head 201a is off track to the track 103c side and the level of reproduced pilot signal $f_{2L}$, or if the arrow direction of the x-axis is the negative direction, it becomes the relationship between the offset amount when the head 201a is off track to the track 103a side and the level of the reproduced pilot signal $f_{1L}$.

FIG. 6 shows a graph 320 representing the relationship between the track offset amount of the head 201a in the pilot signal at a low frequency which is the same as in the prior art and the level of reproduced pilot signal, and a graph 321 representing the relationship between the head 201a in the pilot signal at a frequency about twice as high as that used in the prior art and the level of the reproduced pilot signal.

When the frequency of the pilot signal is low as in the prior art, the reproducing range of the head 201a in the width direction, that is, the apparent head width is wider than the actual head width because the reproduced fringe is 302, and the tracks 103a and 103c adjacent to the head 201a are reproduced in a wide range. Accordingly, as shown in the graph 320 in FIG. 6, the range of linearly detecting the pilot signal is narrow. Depending on the fluctuations of the head width or the like, the reproducing range of the head in the width direction in the pilot frequency band may exceed the width of three tracks, and a dead zone is formed in the tracking error signal in this case.

On the other hand, when the frequency of the pilot signal is about twice as high as in the prior art, the apparent head width of the head 201a is narrower as compared with the case of the low frequency since the reproduced fringe is 303. Besides, as known well, in the low frequency range of the reproduction characteristic of the head, the characteristic is 6 dB/oct, and the detection level is higher than in the case of low frequency. As explained above, when the frequency is high, in the SP mode, the reproduced pilot signal is attenuated as the offset amount of the head increases due to the effect of azimuth characteristic, but in the LP mode, since the track width is narrow, the range for keeping linearity may be narrow. Therefore, the pilot signal can be detected almost linearly in a wide range, and the detection sensitivity may be further enhanced. (Reference: Akio Murata, et al., "Optimization of azimuth angle in digital VTR," Technical Report of the Institute of Electronics, Information and Communication Engineers of Japan, Vol. 90, No. 487 (MR90 63–66), 1991, pp. 17–23).

As is clear from the description herein, by recording the pilot signal of a low frequency as in the prior art in the SP mode and recording the pilot signal of a high frequency, about twice that of the prior art, in the LP mode, the reproducing head can be controlled in tracking at a higher precision in any mode. In the conventional method of performing ATF control when reproducing by recording the pilot signals at the same frequency in two different recording modes, the linear range in the SP mode becomes narrow due to the fringe effect of the head and azimuth characteristic, and a dead zone is formed in LP mode, or the sensitivity is lowered, and all these problems can be solved.

Figure 7A:
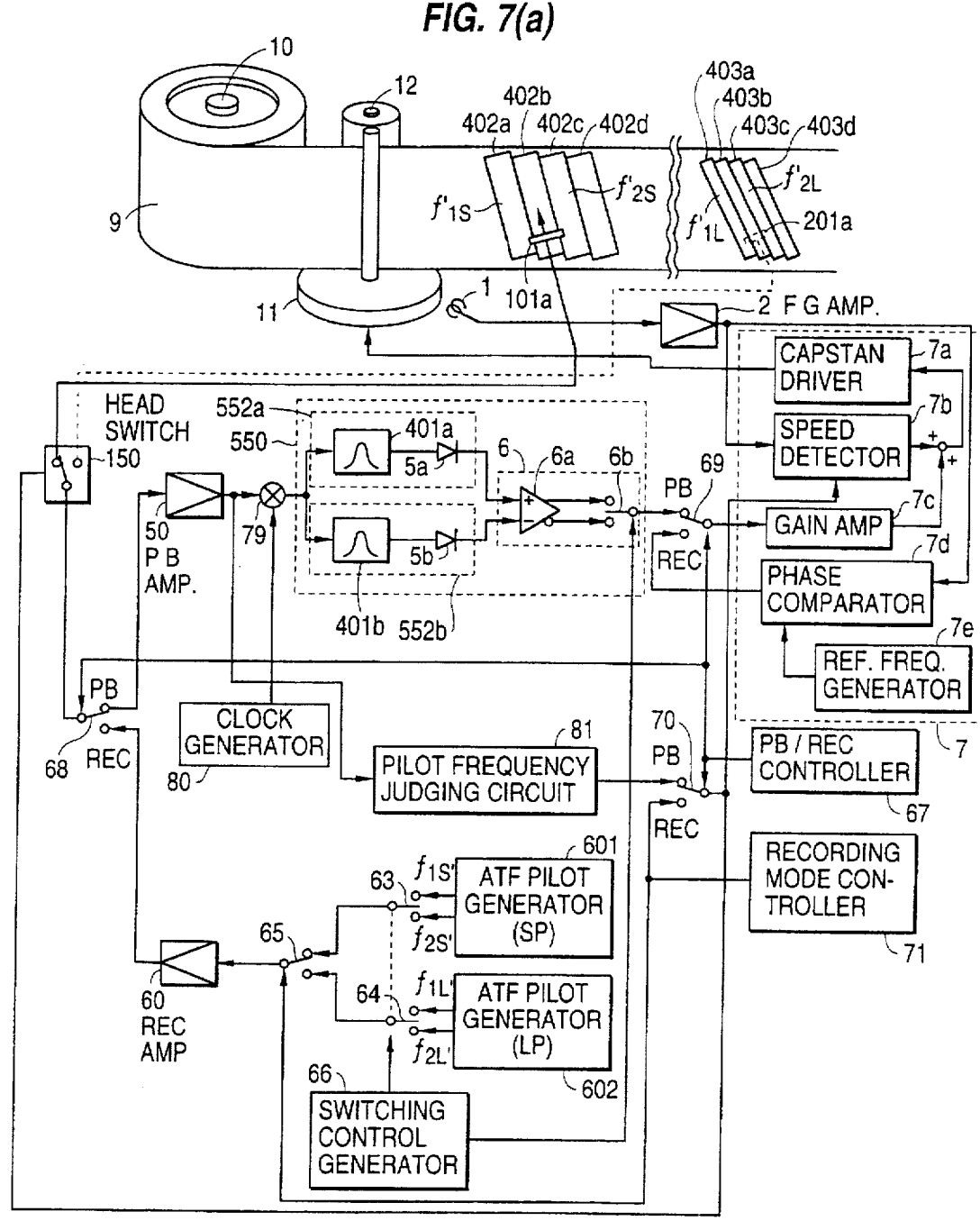
FIGS. 7(a) and 7(b) are structural diagrams of a magnetic recording and reproducing apparatus in accordance with the second embodiment of the present invention.
Figure 7B:
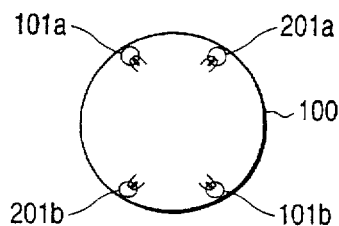

A second embodiment of the present invention is described below while referring to the accompanying drawings. FIGS. 7(a)–7(b) show a structural diagram of a magnetic recording and reproducing apparatus in accordance with the second embodiment of the present invention. The same constituent elements functioning the same as in the first embodiment are identified by same reference numerals and their descriptions have been omitted.

In the first embodiment, the frequency of the pilot signal when recording was different in each mode, and was set higher when the track width was narrower. In the second embodiment, an oscillator 601 outputs pilot signal $f_{1o}'$ and $f_{2o}'$ in the SP mode, and an oscillator 602 issues pilot signals $F_{1L}'$, $f_{2L}'$ in the LP mode, and the relationship of the frequencies is defined as follows.

$$f_{1L}', f_{1o}'+f_o$$

$$f_{2L}', f_{2o}'+f_o$$

These pilot signals are recorded on a magnetic tape (402a to 402d, 403a to 403d) same as in the first embodiment.

The reproducing operation is described below. The reproduced signal to be entered in an ATF error detector 550, that is, the output signal of a reproducing amplifier 50 is converted in frequency by a clock of frequency $f_o/2$ output from a clock generator 80 and a multiplexer 79. While reproducing the track recorded in the SP mode as in the diagram, the reproduced pilot signals $f_{1o}'$ and $f_{2o}'$ are converted as follows.

$$f_{1o}' \rightarrow f_{1o}'-f_o/2 \text{ and } f_{1o}'+f_o/2$$

$$f_{2o}' \rightarrow f_{2o}'-f_o/2 \text{ and } f_{2o}'+f_o/2$$

On the other hand, while reproducing the track recorded in the LP mode, the reproduced pilot signals $F_{1L}'$ and $f_{2L}'$ are converted as follows.

$$f_{1L}' \to f_{1L}' - f_c/2 \text{ and } f_{1L}' + f_c/2$$

$$f_{2L}' \to f_{2L}' - f_c/2 \text{ and } f_{2L}' + f_c/2$$

Hence, $$f_{1L}' \to f_{10}' + f_c/2 \text{ and } f_{10}' + 3f_c/2$$

$$f_{2L}' \to f_{20}' + f_c/2 \text{ and } f_{20}' + 3f_c/2$$

By multiplying the clock of frequency $f_c/2$ by the reproduced signal, the center frequencies of a first bandpass filter 401a and second bandpass filer 401b for composing a first pilot detector 552a and a second pilot detector 552b are fixed at $f_{10}' + f_c/2$ and $f_{20}' + f_c/2$ regardless of mode, and can be hence shared.

As clear from the description herein, in the second embodiment, the frequencies of the pilot signals when recording are not merely different from each other by mode, but the mutual frequency difference is the same, so that it is not necessary to change over the detection region in every mode. Therefore, the bandpass filters can be shared regardless of the mode, and large external components such as coils and capacitors for composing the filters can be saved. Although the judging method of the recording mode is same as in the first embodiment, it is only necessary herein to change over the tape feed speed and head on the basis of the result of the judgement. The frequency of the clock generator 80 is not limited to $f_c/2$. Two frequencies different from each other by $f_o$ may be selectively used depending on whether the mode is the LP mode or the SP mode.

Figure 8A:
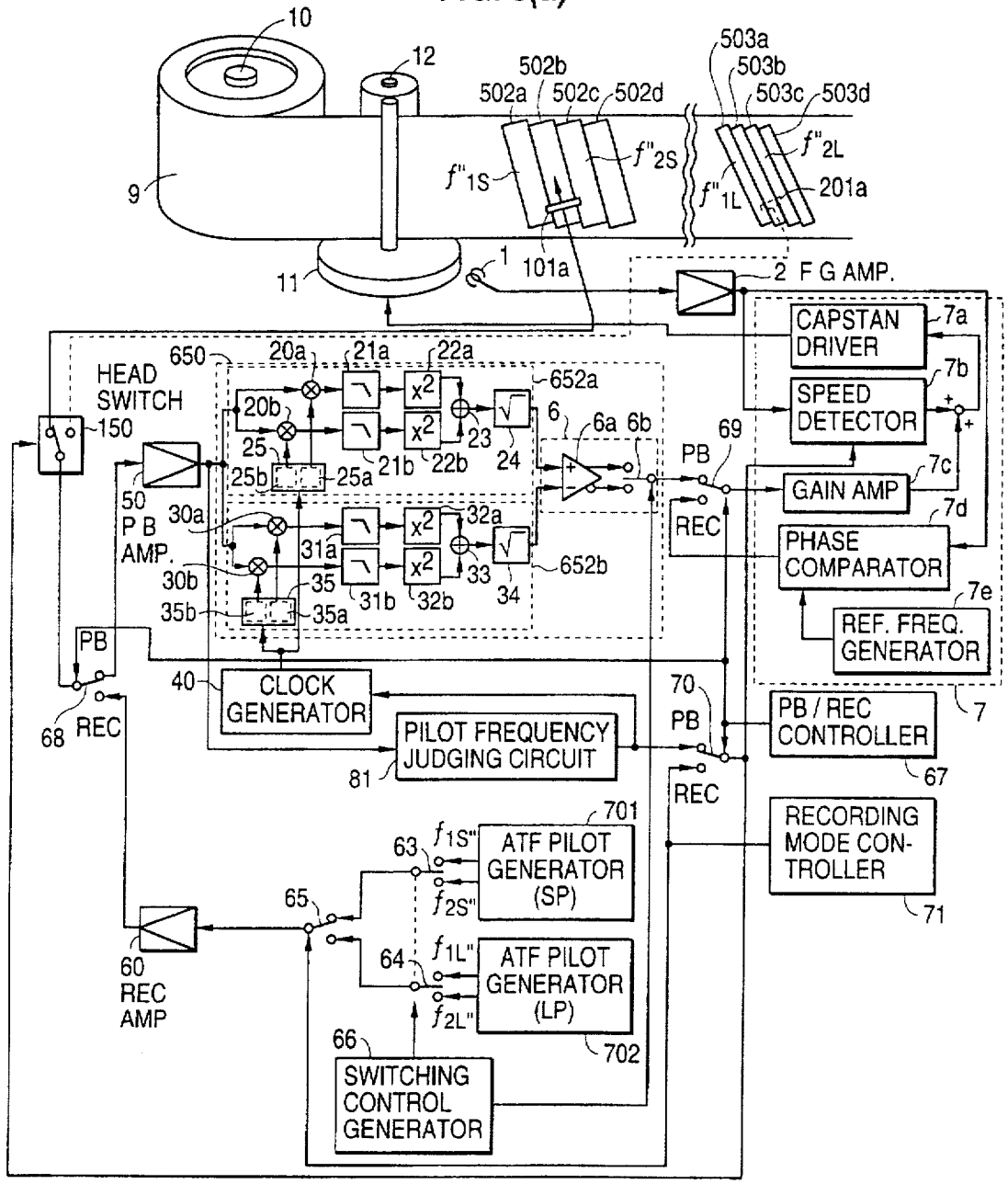
FIGS. 8(a) and 8(b) are structural diagrams of a magnetic recording and reproducing apparatus in accordance with the third embodiment of the present invention.
Figure 8B:
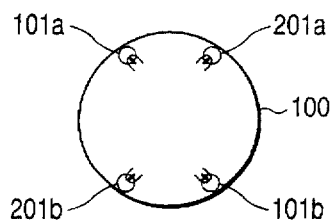

A third embodiment of the present invention is described below while referring to the drawings. FIGS. 8(a)–8(b) are diagrams showing the constitution of a magnetic recording and reproducing apparatus in accordance with the third embodiment of the present invention. Same constituent elements functioning the same as in the first embodiment are identified by the same reference numbers and their descriptions have been omitted.

In addition to the features of the pilot frequency when recording shown in the first embodiment, in the third embodiment, an oscillator 701 outputs pilot signals $f_{10}"$ and $f_{20}"$ in the SP mode, and an oscillator 702 outputs pilot signals $f_{1L}"$ and $f_{2L}"$ in the LP mode, and the frequencies are characterized by the following relationship.

$$f_{1L}" = A f_{10}"$$

$$f_{2L}" = A f_{20}"$$

These pilot signals are recorded on a magnetic tape 9 (502a to 502d, 503a to 503d) the same as in the first and second embodiments. Then, as shown in FIGS. 8(a)–8(b), while the head 101a is reproducing and scanning the track 502b in the SP mode, first and second pilot detectors 652a, 652b operate as described below in an ATF error detector 650.

A first frequency divider 25 is connected to a clock generator 40, and outputs a local pilot at the same frequency $(f_{10r})$ as the reproduced pilot signal $f_{10}"$. Individual first and second frequency dividers 25a and 25b output local pilot signals which are the same in frequency but different in phase by 90 degrees. The outputs $D_{1a}$ and $D_{1b}$ of the first and second frequency dividers 25a and 25b are expressed as follows.

$$D_{1a} = \sin(2\pi f_{10r} t)$$

$$D_{1b} = \cos(2\pi f_{10r} t)$$

A multiplexer 20a multiplies the reproduced signal of the head 101a amplified by the reproducing amplifier 50 and the output $D_{1a}$ of the first frequency divider 25a. A second multiplexer 20b similarly multiplies the reproduced signal and the output $D_{1b}$ of the second frequency divider 25b. Assuming, of the reproduced signals, the pilot signal $f_{10}"$ component H1 to be:

$$H_1 = A_1 \sin(2\pi f_{10}" t)$$

(where $A_1$: amplitude of pilot signal $f_{10}"$, t: time) the output $M_{1a}$ of then the first multiplexer 2Da is expressed as follows.

$$\begin{aligned} M_{1a} &= H_1 \times D_{1a} \\ &= A_1/2\{\cos(2\pi f_{1x}" t - 2\pi f_{1xr} t) - \\ &\quad \cos(2\pi f_{1x}" t + 2\pi f_{1xr} t)\} \\ &= A_1/2\{\cos(\theta_1) - \cos(2\pi f_{1x}" t + 2\pi f_{1xr} t)\} \end{aligned}$$

Likewise, the output $M_{1b}$, of the second multiplexer 20b is as follows.

$$\begin{aligned} M_{1b} &= H_1 \times D_{1b} \\ &= A_1/2\{\sin(2\pi f_{1x}" t - 2\pi f_{1xr} t) + \\ &\quad \sin(2\pi f_{1x}" t + 2\pi f_{1xr} t)\} \\ &= A_1/2\{\sin(\theta_1) + \sin(2\pi f_{1x}" t + 2\pi f_{1xr} t)\} \end{aligned}$$

where $\theta_1$ denotes the phase difference between the reproduced pilot signal $f_{10}"$ and local pilot $f_{10r}$. A first lowpass filter 21a passes only the low frequency signals of the output $M_{1a}$ of the first multiplexer 20a. A second lowpass filter 21b similarly passes only the low frequency signals of the output $M_{1a}$ of the second multiplexer 20b. Therefore, the output L1a of the first lowpass filter 21a passes only the first term of $M_{1a}$, and the output $L_{1b}$ of the second lowpass filter 21b passes only the first term of $M_{1b}$. That is, $$L_{1a} = A_1/2\{\cos(\theta_1)\}$$

$$L_{1b} = A_1/2\{\sin(\theta_1)\}$$

Squaring the outputs of the first and second lowpass filters and mutually adding and taking the square root thereof, a component of half the amplitude of pilot signal $f_{10}"$ is obtained as the output $P_{D1}$ of a first pilot detector 652a.

$$\begin{aligned} P_{D1} &= (L_{1a}^2)^{1/2} \\ &= A_1/2 \end{aligned}$$

(where $\sin^2(\theta_1) + \cos^2(\theta_1) = 1$)

Consequently, a second frequency divider 35 is connected to a clock generator 40, and produces a local pilot signal at the same frequency $f_{20r}$, as the reproduced pilot signal $f_{20}"$. Third and fourth frequency dividers 35a and 35b produce local pilot signals which are the same in frequency and difference in phase by 90 degrees from each other. The outputs $D_{2a}$ and $D_{2b}$ of the third and fourth frequency dividers 35a and 35b are shown below.

$$D_{2a} = \sin(2\pi f_{20r} t)$$

$$d_{2b} = \cos(2\pi f_{20r} t)$$

Next, a third multiplexer 30a multiplies the reproduced signal of the head 101a amplified by the amplifier 50 and the output $D_{2a}$ of the third frequency divider 35a. A fourth multiplexer 30b similarly multiplies the reproduced signal and the output $D_{2b}$ of the fourth frequency divider and the output $D_{2b}$ of the fourth frequency divider. Assuming, of the reproduced signals, the pilot signal $f_{20}"$ component $H_2$ to be:

$$H_2 = A_2 \sin(2\pi f_{20}"t)$$

(where A2: amplitude of pilot signal $f_{20}"$, t: time) then the output $M_{20}$ of the third multiplexer 30a is expressed as follows.

$$\begin{aligned} M_{2a} &= H_2 \times D_{2a} \\ &= A_2/2\{\cos(2\pi f_{2u}"t - 2\pi f_{2sr}t) - \\ &\quad \cos(2\pi f_{2u}"t + 2\pi f_{2sr}t)\} \\ &= A_2/2\{\cos(\theta_2) - \cos(2\pi f_{2u}"t + 2\pi f_{2sr}t)\} \end{aligned}$$

Likewise, the output $M_{2b}$ of the fourth multiplexer 30b is as follows.

$$\begin{aligned} M_{2b} &= H_2 \times D_{2b} \\ &= A_2/2\{\sin(2\pi f_{2u}"t - 2\pi f_{2sr}t) + \\ &\quad \sin(2\pi f_{2u}"t + 2\pi f_{2sr}t)\} \\ &= A_2/2\{\sin(\theta_2) + \sin(2\pi f_{2u}"t + 2\pi f_{2sr}t)\} \end{aligned}$$

where $\theta_2$ denotes the phase difference between the reproduced pilot signal $f_{20}"$ and local pilot $f_{20}$. A third lowpass filter 31a passes only low frequency signals of the output $M_{2a}$ a of the third multiplexer 30a. A fourth lowpass filter 31b similarly passes only low frequency components of the output $M_{2b}$ of the fourth multiplexer 30b. The output $L_{2a}$ of the third lowpass filter 31a passes only the first term of $M_{2a}$, and the output $L_{2b}$ of the fourth lowpass filter 31b passes only the first term of $M_{2b}$. That is, $$L_{2a} = A_2/2\{\cos(\theta_2)\}$$

$$L_{2b} = A_2/2\{\cos(\theta_2)\}$$

Accordingly, squaring the outputs of the third and fourth low pass filters, adding them and taking the square root thereof, a component of ½ the amplitude of pilot signal $f_{20}"$ is obtained as the output $P_{D2}$ of a second pilot detector 652b.

$$\begin{aligned} P_{D2} &= (L_{2a}^2 + L_{2b}^2)^{1/2} \\ &= A_2/2 \end{aligned}$$

(where $\sin^2(\theta_2) + \cos^2(\theta_2) = 1$)

Explained so far is the example of reproducing the tracks recorded in the SP mode, and when reproducing the tracks recorded in the LP mode, the modes can be easily changed over by multiplying the frequency of the clock generator 40 by A, and the operation of the pilot detectors 652a and 652b is the same as in the SP mode. The recording mode judging method is same as in the first embodiment, and herein, depending on the result of judgement, the tape feed speed, clock generator frequency, and head are changed over.

As is clear from the description herein, in the third embodiment, the frequencies of pilot signals in recording are not merely different from each other by modes, but the ratio of the mutual frequencies is equal, so that the detection band and setting time can be equalized regardless of the mode, thereby making the design of the control system easy. For example, along with the digitization of the servo circuit, the residual deviation may be same between modes at same the sampling point, and setting of sampling point in every mode is not necessary.

Furthermore, by digital processing of the ATF error detector, the number of large external parts such as coils and capacitors is reduced, and adjusting points such as detection bands can be saved, so that the apparatus may be reduced in size and lowered in cost.

Moreover, the pilot frequency judging circuit for judging the recording mode in reproducing may be further reduced in size and lowered in cost by applying the pilot detector in the third embodiment.

In the first, second, and third embodiments, the two frequency ATF system is described, but the invention may be also applied in the ATF systems of one frequency or more, and is not limited to the existing one-frequency or four-frequency pilot ATF system. Besides, instead of the judgement of two modes of SP and LP, it is possible to be applied to other plural modes.

Hereinafter, a tracking error detector for the magnetic recording and reproducing apparatus of the present invention is described.

FIG. 9 is a block diagram of a first embodiment of a tracking error detector for the magnetic recording and reproducing apparatus.

In ATF control, pilot signals of several different frequencies are sequentially and cyclically changed, and recorded by multiplexing in frequency or modulating in the information to be recorded. A pilot signal of f1 is recorded in a track 1507, and a pilot signal of f2 is recorded in a track 1509. In reproducing, when a head 1505 scans a target track 1508, pilot signals f1 and f2 leaking in from tracks 1507 and 1509 adjacent to the target track 1508 are reproduced as reproduced signals together with the target information signal. The difference of the amplitudes of the pilot signals f1 and f2 from both adjacent tracks contained in the reproduced signals is detected by a tracking error detector 1511. The amplitude of the pilot signal varies differentially depending on the deviation of the target track and the head. That is, as the head 1505 is deviated in scanning toward the track 1507, the amplitude of the pilot signal f1 increases, or when scanning is deviated to the track 1509, the amplitude of the pilot signal f2 increases. Hence, the tracking error signal determining the difference is a signal changing in polarity depending on the tracking. Using thus obtained tracking error signal, as the servo circuit 1506 controls the capstan motor 1510, the configuration of the head 1505 and the target track 1508 can be always kept correctly.

The operation of the tracking error detector 1511 is explained below. In FIG. 9, element 1002 is a filter, element 1003 is a sampling circuit, element 1004 is a first amplitude detector, element 1005 is a second amplitude detector, element 1006 is a subtracting circuit, element 1008 is a clock generator, and element 1009 is a sampling clock generator. From a terminal 1001, a reproduced signal is entered. The reproduced signal contains pilot signals having frequencies f1 [Hz] and f2 [Hz]. The reproduced signal is deprived of a causative component of aliasing noise in sampling by the filter 1002, and sampled in the sampling circuit 1003. The sampling clock at this time is created by dividing the output of the clock generator 1008 by the sampling clock generator 1009 so that the frequency may be fs [Hz] being a common multiple of f1 and f2. As the filter 1002, meanwhile, by using a bandpass filter with the pass band in the vicinity of the pilot frequency, the SNR of the A/D input signal is improved, and the detection precision is enhanced. From the output of the sampling circuit 1003, in the first amplitude detector 1004, the amplitude of the pilot signal of f1 [Hz] is detected by using the sampling clock, and in the second amplitude detector 1005, similarly, the amplitude of the pilot signal of f2[Hz] is detected. The subtracting circuit 1006 finds the difference between the output of the first amplitude detector 1004 and the output of the second amplitude detector 1005, and outputs a tracking error signal to the terminal 1007. The first amplitude detector 1004 and second amplitude detector 1005 utilize envelope detection, orthogonal two-phase signal multiple detection, etc.

Figure 10:
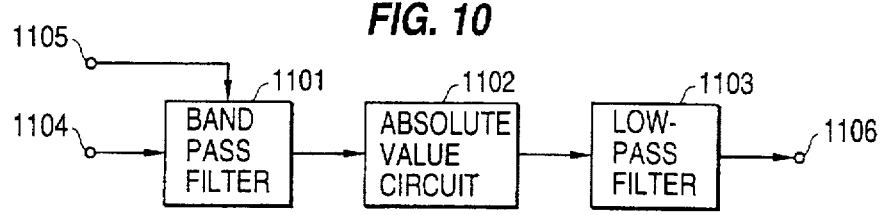
FIG. 10 is a block diagram in which an amplitude detector is an envelope detector in the first embodiment of the tracking error detector for the magnetic recording and reproducing apparatus of the present invention.

The amplitude detector using envelope detection is described below. Herein, the frequency of the signal to be detected is supposed to be fn [Hz]. However, the pilot frequency fn is same as f1 and f2 mentioned above. FIG. 10 is a block diagram of the amplitude detector using envelope detection. The signal containing the frequency fn [Hz] input from a terminal 1104 passes only the component of fn [Hz] by a bandpass filter 1101, and the amplitude is determined by an absolute value circuit 1102 and a lowpass filter 1103, and a signal proportional to the amplitude of a signal at frequency fn [Hz] is output from a terminal 1106.

Figure 11:
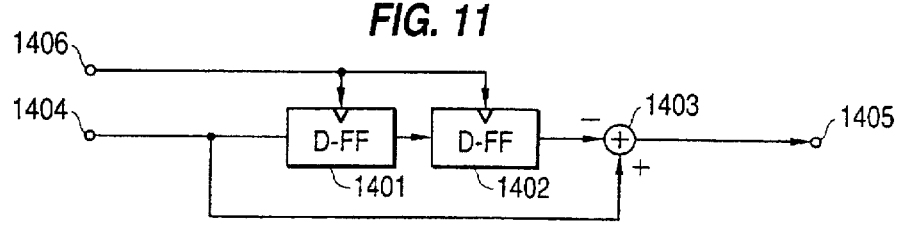
FIG. 11 is an example of a bandpass filter in the first embodiment of the tracking error detector for the magnetic recording and reproducing apparatus of the present invention.

At this time, the operation clock of the bandpass filter 1101 input from a terminal 1105 is a sampling clock which is an output of the sampling clock generator 1009 in FIG. 9. Accordingly, the frequency is a multiple of fn, and the constitution of the bandpass filter 1101 for passing fn[Hz] is simplified. For example, if the sampling frequency to be 4fn, then the bandpass FIR filter is realized by delay flip-flops 1401 and 1402, and a subtracting circuit 1403 as shown in FIG. 11. It is realized only by feeding the sampling clock from a terminal 1404 directly into the delay flip-flop.

Figure 12:
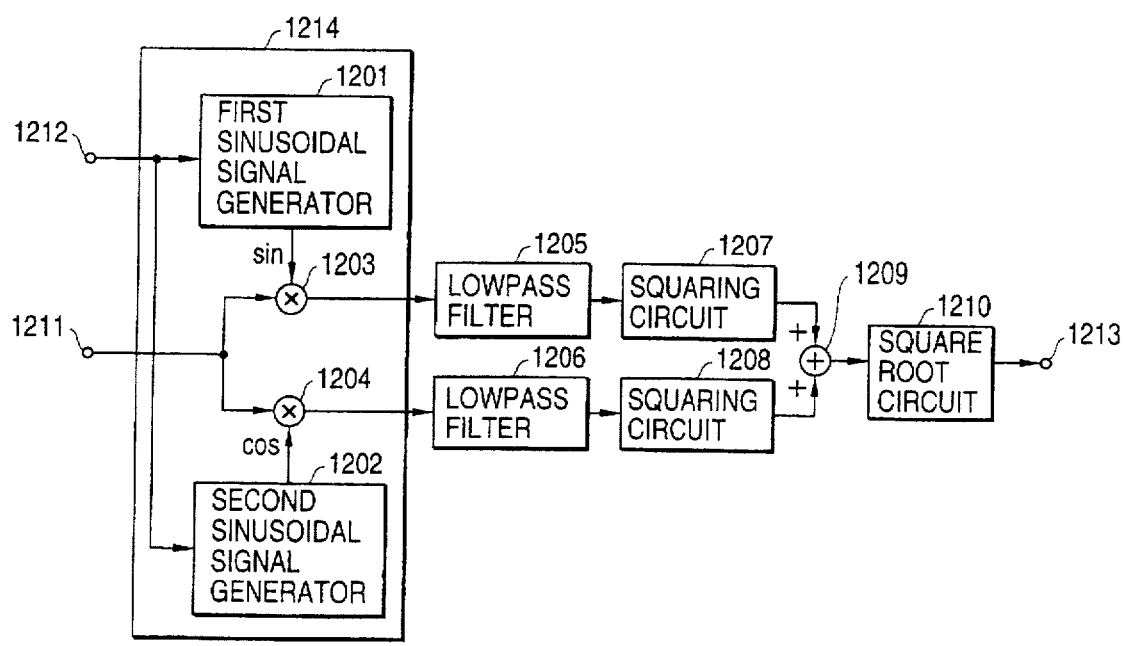
FIG. 12 is a block diagram in which the amplitude detector is an orthogonal two-phase signal multiple detection in the first embodiment of the tracking error detector for the magnetic recording and reproducing apparatus of the present invention.

Next, the amplitude detector using orthogonal two-phase signal multiple detection is described. As in the explanation of the envelope detection, the frequency to be detected is fn [Hz]. FIG. 12 is a block diagram of the amplitude detector using orthogonal two-phase signal multiple detection. The input signal input from a terminal 1211 contains a pilot signal, and assuming the amplitude to be A, it can be expressed as follows.

$$A \sin(2\pi fnt+x)+N$$

where t is time [sec], x is phase [rad], and N is signal at frequency other than fn [Hz] out of the input signal. A first sinusoidal signal generator 1201 and a second sinusoidal signal generator 1202 produce sinusoidal waves at frequency of fn [Hz] and phase difference of $\pi/2$. The outputs of the first sinusoidal signal generator 1201 and second sinusoidal signal generator 1202 can be expressed respectively as sin2πfnt, cos2πfnt. Hence the output of a multiplexer 1203 is $$\{A\sin(2\pi fnt + x) + N\} \times \sin 2\pi =$$

$$A/2\{\cos x - \cos(4\pi fnt + x)\} + N\sin 2\pi fnt$$

On the other hand, the output of a multiplexer 1204 is $$\{A\sin(2\pi fnt + x) + N\} \times \cos 2\pi fnt =$$

$$A/2\{\sin x - \sin(4\pi fnt + x)\} + N\cos 2\theta fnt$$

By passing them through lowpass filters 1205 and 1206, only DC components are left over, and the output of the lowpass filter 1205 becomes Acosx/2, and the output of the lowpass filter 1206 is Asinx/2. By squaring the above two formulas in squaring circuits 1207 and 1208, their sum is determined in an adder 1209 as follows.

$$(A\cos x/2)^2 + (A\sin x/2)^2 = A^2(\cos^2 x + \sin^2 x)/4$$
$$= A^2/4$$

Its positive square root is calculated in a square root circuit 1210, and the result is A/2, and a signal proportional to the amplitude A of the signal at fn [Hz] can be obtained from a terminal 1213.

Figure 13:
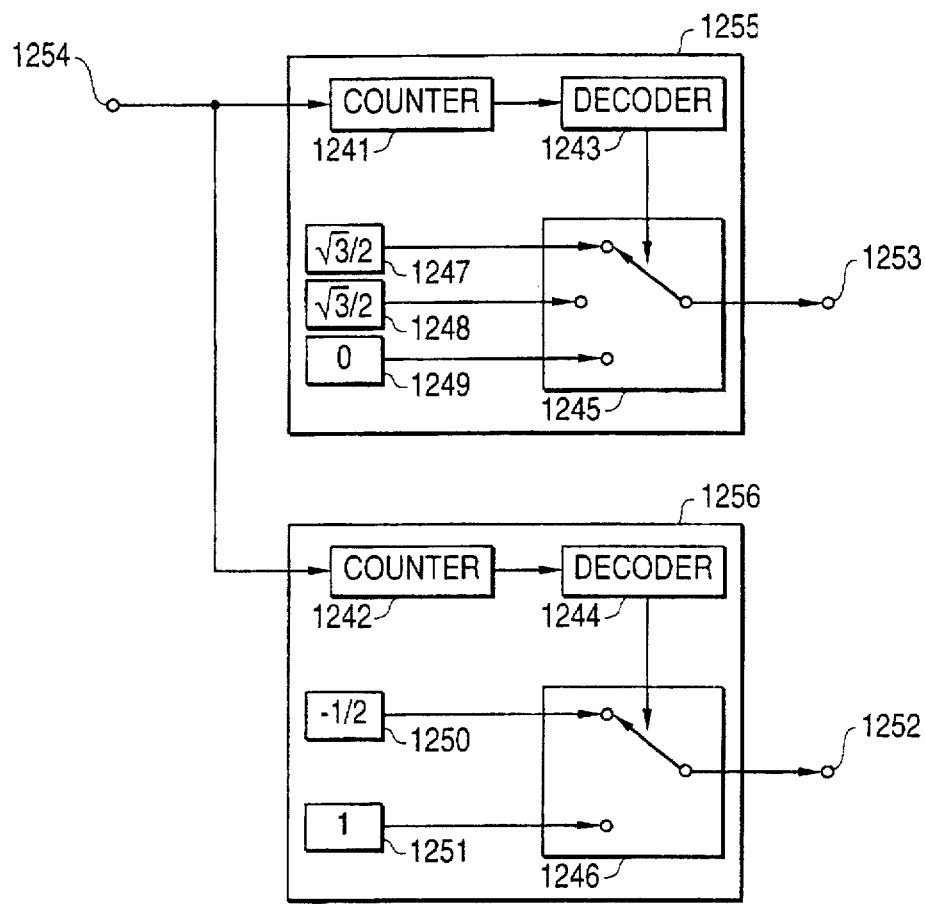
FIG. 13 is a structural diagram of a sinusoidal generator in the first embodiment of the tracking error detector for the magnetic recording and reproducing apparatus of the present invention.

Herein, sinusoidal signal generators 1201 and 1202 produce the sinusoidal signals values at frequency fn [Hz] sampled by the sampling clock entered from a terminal 1212. This output pattern is a repetition from q=1 to fs/fn of sin(2πfnq/fs) from the first sinusoidal signal generator 1201, and cos (2πfnq/fs) from the second sinusoidal signal generator 1202 (where q=1, 2, . . . , fs/fn, fs: sampling frequency), and the first sinusoidal signal generator 1201 and second sinusoidal signal generator 1202 are composed of circuits for producing these repetitive patterns according to the sampling signal entered from the terminal 1212. For example, when fs=3fn, it follows that q=1, 2, 3, and the output pattern of the first sinusoidal signal generator is a repetition of $3^{1/2}/2, -3^{1/2}/2, 0$, and the output pattern of the second sinusoidal signal generator is a repetition of –½, –½, 1. Hence, as shown in FIG. 13, a first sinusoidal signal generator 1255 is composed of a circuit for selecting one of a circuit 1247 for producing $3^{1/2}/2$, a circuit 1248 for producing $-3^{1/2}/2$, and a circuit 1249 for producing 0, by a selector 1245 in synchronism with the sampling signal entered from a terminal 1254, and producing from a terminal 1253, and a second sinusoidal signal generator 1256 is composed of a circuit for selecting one of a circuit 1250 for producing –½ and a circuit 1251 for producing 1, by a selector 1246, and producing from a terminal 1252.

Square circuits and square root circuits may be composed of ROMs and other memories.

Figure 14:
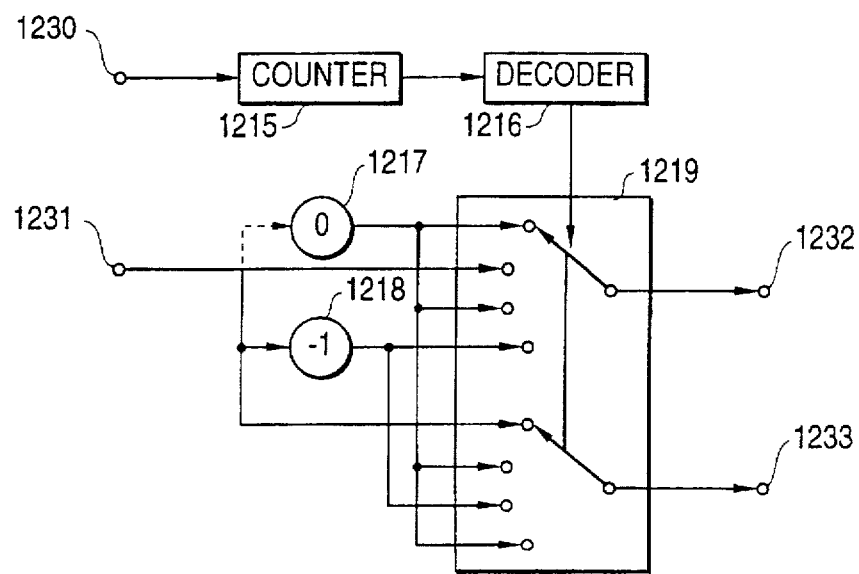
FIG. 14 is a block diagram of a sinusoidal multiplexer in the first embodiment of the tracking error detector for the magnetic recording and reproducing apparatus of the present invention.

Incidentally, when the sampling frequency fs is selected to be four times one of the pilot frequencies fn [Hz], the pattern of the output signal of the first sinusoidal signal generator 1201 is 0, 1, 0,–1, 0, 1, 0, –1, . . . , and the output pattern of the second sinusoidal signal generator 1202 is 1, 0, –1, 0, 1, 0, –1, 0, . . . . Accordingly, a sinusoidal signal multiplier 1214 combining the sinusoidal signal generators 1201 and 1202 and multiplexers 1203 and 1204 does not require multiplication as shown in FIG. 14, so that the constitution may be simplified. In FIG. 14, a terminal 1231 is an input terminal of signals including pilot signals, element 1217 is a circuit for producing 0, element 1218 is a circuit for inverting the sign, element 1219 is a selector, a terminal 1230 is a sampling signal input terminal, element 1215 is a counter, and element 1216 is a decoder. Every time a sampling signal is entered from the terminal 1230, the selector 1219 is changed over, and from the terminal 1232, products of the input signal from the terminal 1231 sequentially multiplied by 0, 1, 0, –1, 0, 1, 0, –1, are produced. Similarly,from the terminal 1233, products of the input signal from the terminal 1231 sequentially multiplied by 1, 0, –1, 0, 1,0, –1, 0, . . . are produced.

Thus, by selecting the sampling clock at an integer multiple of each pilot frequency, the filter and multiplexer can be composed easily. In particular, when the sampling clock is four times the pilot frequency, the multiplier is not substantially needed in the multiplexer, so that it is effective for simplifying the circuit composition.

FIG. 15 is a block diagram of a second embodiment of a tracking error detector for the magnetic recording and reproducing apparatus of the present invention. In the diagram, element 1012 is a filter, element 1013 is a sampling circuit, element 1014 is a time-sharing amplitude detector, element 1016 is a time-sharing subtracting circuit, element 1018 is a clock generator, and element 1019 is a sampling clock generator. The operation of thus composed tracking error detector is described below.

Reproduced signals are fed from the terminal 1011. There produced signals contain pilot signals at frequencies of f1 [Hz] and f2 [Hz]. The reproduced signals are deprived of causative components of aliasing noise in sampling by the filer 1012, and sampled in the sampling circuit 1013. The sampling clock at this time is created by dividing the output of the clock generator 1018 to a frequency of fs [Hz] as a common multiple of f1 and f2, in the sampling clock generator 1019. From the output of the sampling circuit 1013, the amplitude of the pilot signals of f1 [Hz] and f2[Hz] is detected by the time-sharing amplitude detector 1014 in time sharing, and a signal proportional to the amplitude of the pilot signal f1 and a signal proportional to the amplitude of the pilot signal f2 are produced alternately in the time-sharing subtracting circuit 1016, the difference of the amplitude of the alternately detected pilot signals f1 [Hz] and f2 [Hz] is determined, and a tracking error signal is produced to the terminal 1017. The time-sharing amplitude detector 1014 employs orthogonal two-phase signal multiple detection, envelope detection, etc. The time-sharing subtracting circuit 1016 is composed of a delay 1021, a subtracting circuit 1022, and a latch 1023, and the pilot signals f1 and f2 alternately entering in time series are delayed, and the difference from the original signal is determined in the subtracting circuit 1022. As a result, (amplitude of pilot signal f–amplitude of pilot signal f2) and (amplitude of pilot signal f2–amplitude of pilot signal f1) are alternately produced from the subtracting circuit 1022. Of them, by producing only a desired signal from the latch 1023, a tracking error signal is obtained. FIGS. 16(*a*)–16(*c*) form a time chart of detection process of this tracking error detector. FIG. 16(*a*) is an output of the sampling circuit 1013; FIG. 16(*b*) is an output of the time-sharing amplitude detector 1014, and FIG. 16(*c*) is an output of the time-sharing subtracting circuit 1016. The sampled signal 1601 is fed into the time-sharing amplitude detector 1014, and a signal 1603 proportional to the amplitude of pilot signal f1 and a signal 1604 proportional to the amplitude of pilot signal f2 are obtained. The difference of these signals is calculated in the time-sharing subtracting circuit 1016. Thus, a tracking error signal 1607 is obtained. In the second embodiment of the tracking error detector for the magnetic recording and reproducing apparatus, since the amplitude detector detects the amplitude of the pilot signals in time multiplex, it is composed of one time-sharing detector, and the circuit scale is smaller than in the first embodiment of the tracking error detector for the magnetic recording and reproducing apparatus.

An example below shows the constitution by using two-phase signal multiple detection in the time-sharing amplitude detector in the second embodiment of the tracking error detector for the magnetic recording and reproducing apparatus. FIG. 17 is a structural diagram of the time-sharing amplitude detector in the second embodiment of the tracking error detector for the magnetic-recording and reproducing apparatus.

A time-sharing sinusoidal signal generator 1301 produces, from the sampling clock entered through a terminal 1312, a two-phase (phase difference π/2) signal of pilot detection signal of f1 [Hz] and a two-phase (phase difference π/2) signal of pilot detection signal of f2 [Hz], in time multiplex by the value sampled by f2 [Hz]. The output patterns are as follows.

$\sin(2\pi f\, 1\times 1/fs)$ $\cos(2\pi f\, 1\times 1/fs)$ $\sin(2\pi f\, 2\times 1/fs)$ $\cos(2\pi f\, 2\times 1/fs)$ $\sin(2\pi f\, 1\times 2/fs)$ $\cos(2\pi f\, 1\times 2/fs)$ $\sin(2\pi f\, 2\times 2/fs)$ $\cos(2\pi f\, 2\times 2/fs)$ $\sin(2\pi f\, 1\times q/fs)$ $\cos(2\pi f\, 1\times q/fs)$ $\sin(2\pi f\, 2\times q/fs)$ $\cos(2\pi f\, 2\times q/fs)$ where q is the least common denominator of fs/f1 and fs/f2, and the output patterns are repetition of them. In a multiplexer 1303, the output signal of the time-sharing sinusoidal signal generator 1301 and the output signal of sampling circuit entered from a terminal 1311 are multiplied. In a time-sharing lowpass filter 1305, from the output signals of two phases and two sets multiplexed in time from the multiplexer 1303, the low frequency components of the signals are detected. In a squaring circuit 1307, the output from the time-sharing lowpass filter 1305 is squared. In a time-sharing adder 1309, the outputs from two phases and two sets of the squaring circuit 1307 multiplexed in time are summed in two phases and the result is produced. In a square root circuit 1310, square roots of two outputs of the time-sharing adder 1309 is determined, and the outputs of the amplitude detector, that is, the amplitudes of the pilot signals f1 and f2 are alternately output to a terminal 1313. The time-sharing adder 1309 is composed of a delay 1324, an adder 1323, and a latch 1325, and In the same principle as the time-sharing subtracting circuits In FIG. 15 and FIG. 16, the outputs of the squaring circuit 1307 are added between two phases of each pilot frequency. The time-sharing lowpass filter 1305 consists of, as shown in FIG. 18, delays 1334, 1335, 1336 and 1337, an adder 1333, a circuit 1338 for multiplying constant 1-p, and a circuit 1339 for multiplying constant p. Herein, by setting the delay time of the delays 1334, 1335, 1336 and 1337 as one period of signal shared in time, four signals arranged in time series can be passed, only of the low frequency components, independently, thereby playing the role of the time-sharing lowpass filter. The time-sharing lowpass filter shown in FIG. 18 is shown herein, but in the lowpass filter of other type, by dividing the delay in four divisions, the same effects are brought about, and the time-sharing lowpass filter may be replaced by a lowpass filter of another type.

FIGS. 19(*a*)–19(*d*) form a time chart of the detection process of this amplitude detector. FIG. 19(*a*) is an input of amplitude detector; FIG. 19(*b*) is an output of time-sharing sinusoidal signal multiplier; FIG. 19(*c*) is an output of time-sharing adder, and FIG. 19(*d*) is an output of time-sharing subtracting circuit. The sampled signal 1801 is fed into the time-sharing sinusoidal signal multiplier 1314, from which a signal 1803 multiplied by f1 sin signal, a signal 1804 multiplied by f1 cos signal, a signal 1805 multiplied by f2 sin signal, and a signal 1806 multiplied by f2 cos signal are obtained. By the repetition in the same process as in FIG. 16, addition between two phases, square root calculation and subtraction between amplitudes of pilot signals f1 and f2 are performed, and a tracking error signal 1814 is obtained.

The square circuit and square root circuit may be composed of ROMs and other memories, as in the first embodiment of the tracking error detector for the magnetic recording and reproducing apparatus.

Figure 20:
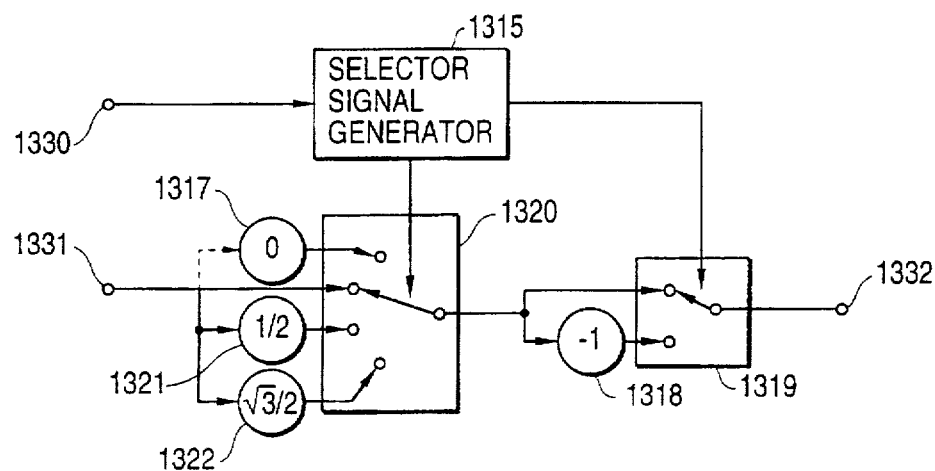
FIG. 20 is a block diagram of a time-sharing sinusoidal signal multiplexer in the second embodiment of the tracking error detector for the magnetic recording and reproducing apparatus of the present invention.

Incidentally, when two pilot frequencies f1 and f2 are in the relationship of f2 =1.5×f1, the time-sharing sinusoidal signal multiplier 1314 in FIG. 17 can be realized by the constitution as shown in FIG. 20. That is, assuming the sampling frequency to be fs=B×f1=4×f2, then the values to be multiplied in the time-sharing sinusoidal signal multiplier 1314 are as follows:

$\sin (2\pi f 1 \times 1/f s) = 3^{1/2}/2$ $\cos (2\pi f 1 \times 1/f s) = 1/2$ $\sin (2\pi f 2 \times 1/f s) = 1$ $\cos (2\pi f 2 \times 1/f s) = 0$ $\sin (2\pi f 1 \times 2/f s) = 3^{1/2}/2$ $\cos (2\pi f 1 \times 2/f s) = -1/2$ $\sin (2\pi f 2 \times 2/f s) = 0$ $\cos (2\pi f 2 \times 2/f s) = -1$ $\sin (2\pi f 1 \times 3/f s) = 0$ $\cos (2\pi f 1 \times 3/f s) = -1$ $\sin (2\pi f 2 \times 3/f s) = -1$ $\cos (2\pi f 2 \times 3/f s) = 0$ $\sin (2\pi f 1 \times 24/f s) = 0$ $\cos (2\pi f 1 \times 24/f s) = 1$ $\sin (2\pi f 2 \times 24/f s) = 0$ $\cos (2\pi f 2 \times 24/f s) = 1$ which means to be any one of 0, 1, ½, $3^{1/2}/2$, −1, −½, $−3^{1/2}/2$. Hence, any value of products of the input value from the terminal 1331 multiplied by 0, 1, ½, $3^{1/2}/2$ by the multiplexers 1321, 1322 or the circuit 1317 for producing 0 is selected by the selector 1320, and by selecting either this output or the product of this output multiplied by −1 by the selector 1319, a desired multiplied value is obtained. In this embodiment of amplitude detector, by detecting signals of two sets and two phases in amplitude detection of each pilot signal in time multiplex, it is possible to time-share the amplitude detector for one phase, so that it is effective for reducing the circuit scale.

The case in which the amplitude detector effects an envelope detection of a two-frequency pilot signal or effects on orthogonal two-phase signal multiple detection has been previously explained, but the invention is similarly applicable, as is evident, to a pilot signal detection using four-frequency pilot signals or one frequency pilot signal such as an 8 mm video cassette recorder and digital audio tape recorder.

What is claimed is:

1. A tracking error detector used in a magnetic recording and reproducing apparatus for reproducing tracks formed obliquely with respect to a longitudinal direction of a magnetic tape in which pilot signals have been recorded in multiplex with an information signal by a rotary head, and forming a tracking error signal for correcting a deviation of a scanning track of the rotary head relative to a target track to be scanned by the rotary head by a level difference of pilot signals reproduced from both adjacent tracks adjacent to the target track, said tracking error detector comprising:

a sampler, said sampler analog-digital converting a reproduced signal at a predetermined sampling frequency which is substantially equal to a common multiple of each pilot frequency leaking in from both adjacent tracks;

a time-sharing amplitude detector, said time-sharing amplitude detector detecting, from an output signal of said sampler, an amplitude of a first pilot signal from one of the adjacent tracks and an amplitude of a second pilot signal from the other of the adjacent tracks alternately in a time-sharing manner; and a subtractor, said subtractor determining a difference between the amplitude of the first pilot signal and the amplitude of the second pilot signal to obtain the tracking error signal.

2. A tracking error detector as recited in claim 1, wherein said time-sharing amplitude detector comprises:

a time-sharing sinusoidal signal generator, said time-sharing sinusoidal signal generator generating sequentially in a time-sharing manner a first sinusoidal signal having a frequency substantially equal to a pilot frequency of the first pilot signal, a second sinusoidal signal having a frequency substantially equal to the frequency of the first sinusoidal signal and a phase difference of π/2 from the first sinusoidal signal, a third sinusoidal signal having a frequency substantially equal to a pilot frequency of the second pilot signal, and a fourth sinusoidal signal having a frequency substantially equal to the frequency of the third sinusoidal signal and a phase difference of π/2 from the third sinusoidal signal;

a time-sharing multiplier, said time-sharing multiplier sequentially multiplying the first sinusoidal signal, the second sinusoidal signal, the third sinusoidal signal, and the fourth sinusoidal signal by the output signal of the sampler to obtain a first multiplied signal, a second multiplied signal, a third multiplied signal, and a fourth multiplied signal, respectively;

a time-sharing lowpass filter, said time-sharing lowpass filter sequentially passing low frequency components of the first multiplied signal, the second multiplied signal, the third multiplied signal, and the fourth multiplied signal to obtain a first low frequency component signal, a second low frequency component signal, a third low frequency component signal, and a fourth low frequency component signal, respectively;

a time-sharing squaring circuit, said time-sharing squaring circuit sequentially squaring the first low frequency component signal, the second low frequency component signal, the third low frequency component signal, and the fourth low frequency component signal to obtain a first square signal, a second square signal, a third square signal, and a fourth square signal, respectively;

a time-sharing adder, said time-sharing adder adding the first square signal to the second square signal to obtain a first sum signal and adding the third square signal to the fourth square signal to obtain a second sum signal so that the first and second sum signals occur alternately in a time-sharing manner; and a square root circuit, said square root circuit sequentially calculating a square root of the first sum signal and a square root of the second sum signal to obtain the amplitude of the first pilot signal and the amplitude of the second pilot signal, respectively.

* * * * *